US012754024B2

(12) United States Patent
Christie et al.

(10) Patent No.: US 12,754,024 B2
(45) Date of Patent: Oct. 6, 2026

(54) CO-PRESENCE PRESENTATION SYSTEM

(71) Applicant: Uber Technologies, Inc., San Francisco, CA (US)

(72) Inventors: John Jacob Christie, San Francisco, CA (US); Rebecca Leigh Maxworth, San Francisco, CA (US); Christopher James Meschino, Berkeley, CA (US); Dylan Babbs, New York, NY (US); Jacqueline Yilan Ji, San Francisco, CA (US); Jordan Ponce, San Francisco, CA (US); Steven William Schelter, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 8 days.

(21) Appl. No.: 18/933,533

(22) Filed: Oct. 31, 2024

(65) Prior Publication Data

US 2025/0146826 A1 May 8, 2025

Related U.S. Application Data

(60) Provisional application No. 63/640,550, filed on Apr. 30, 2024, provisional application No. 63/595,934, filed on Nov. 3, 2023.

(51) Int. Cl.
*G01C 21/34* (2006.01)
*G01S 5/02* (2010.01)
(Continued)

(52) U.S. Cl.
CPC ........ *G01C 21/3438* (2013.01); *G01S 5/0231* (2013.01); *G01S 13/0209* (2013.01);
(Continued)

(58) Field of Classification Search
CPC ............... G01C 21/3438; G01S 5/0231; G01S 13/0209; G06Q 50/47; H04W 4/025; H04W 4/80
(Continued)

(56) References Cited

U.S. PATENT DOCUMENTS 9,378,467 B1 * 6/2016 Chaiyochlarb ........ G06N 20/00
11,553,307 B2 1/2023 Albada et al.
(Continued)

FOREIGN PATENT DOCUMENTS

JP 2000242898 A * 9/2000

OTHER PUBLICATIONS

"International Application Serial No. PCT US2024 053913, International Search Report mailed Jan. 23, 2025", 3 pgs.
(Continued)

*Primary Examiner* — Isaac G Smith
(74) *Attorney, Agent, or Firm* — Schwegman Lundberg & Woessner, P.A.

(57) ABSTRACT

The disclosed examples are directed to systems and methods for performing co-presence estimation. The systems and methods detect, by a first device associated with a first user, a beacon signal generated by a second device associated with a second user and generate co-presence information representing proximity between the first device and the second device based on detecting the beacon signal. The systems and methods select a graphical indicator from a plurality of graphical indicators of co-presence based on the generated co-presence information and present a proximity graphical user interface (GUI) comprising a map portion and a co-presence portion using the selected graphical indicator.

20 Claims, 10 Drawing Sheets

(51) Int. Cl.
*G01S 13/02* (2006.01)
*G06Q 50/47* (2024.01)
*H04W 4/02* (2018.01)
*H04W 4/80* (2018.01)

(52) U.S. Cl.
CPC ............ *G06Q 50/47* (2024.01); *H04W 4/025* (2013.01); *H04W 4/80* (2018.02)

(58) Field of Classification Search
USPC .......................................................... 701/516
See application file for complete search history.

(56) References Cited

U.S. PATENT DOCUMENTS

| | | | | |
|---|---|---|---|---|
| 2016/0029148 | A1* | 1/2016 | Jackson | H04W 4/70<br>455/41.2 |
| 2017/0169535 | A1* | 6/2017 | Tolkin | G01C 21/3438 |
| 2018/0189713 | A1 | 7/2018 | Matthiesen et al. | |
| 2019/0205785 | A1 | 7/2019 | Volk et al. | |
| 2020/0359170 | A1* | 11/2020 | Werner | G01S 13/765 |
| 2022/0082394 | A1* | 3/2022 | Radakovic | G01C 21/3461 |
| 2022/0335807 | A1* | 10/2022 | De Jong | H04W 12/63 |
| 2025/0314784 | A1 | 10/2025 | Wang et al. | |

OTHER PUBLICATIONS

"International Application Serial No. PCT US2024 053913, Written Opinion mailed Jan. 23, 2025", 6 pgs.
"International Application Serial No. PCT US2024 053913, International Preliminary Report on Patentability mailed May 15, 2026", 8 pgs.

* cited by examiner

CO-PRESENCE PRESENTATION SYSTEM

CROSS-REFERENCE TO RELATED APPLICATIONS

This application is a non-provisional of and claims priority to U.S. Prov. Application No. 63/595,934, filed Nov. 3, 2023, and U.S. Prov. Application No. 63/640,550, filed Apr. 30, 2024, each of which is hereby incorporated by reference in its entirety.

TECHNICAL FIELD

The subject matter disclosed herein generally relates to special-purpose machines configured to determine locations of user devices and to the technologies by which such special-purpose machines become improved compared to other machines that determine locations of user devices.

BACKGROUND

The reliability and accuracy of operating many transport systems relies on correctly measuring and determining co-presence between devices. Specifically, such transport systems usually compute fares based on how long a user spends in a vehicle. Some transport systems provide estimates to users for when goods will be delivered based on how long providers spend waiting for the goods to be prepared.

BRIEF DESCRIPTION OF THE DRAWINGS

Some examples are illustrated by way of example and not limitation in the figures of the accompanying drawings.

DETAILED DESCRIPTION

Figure 1:
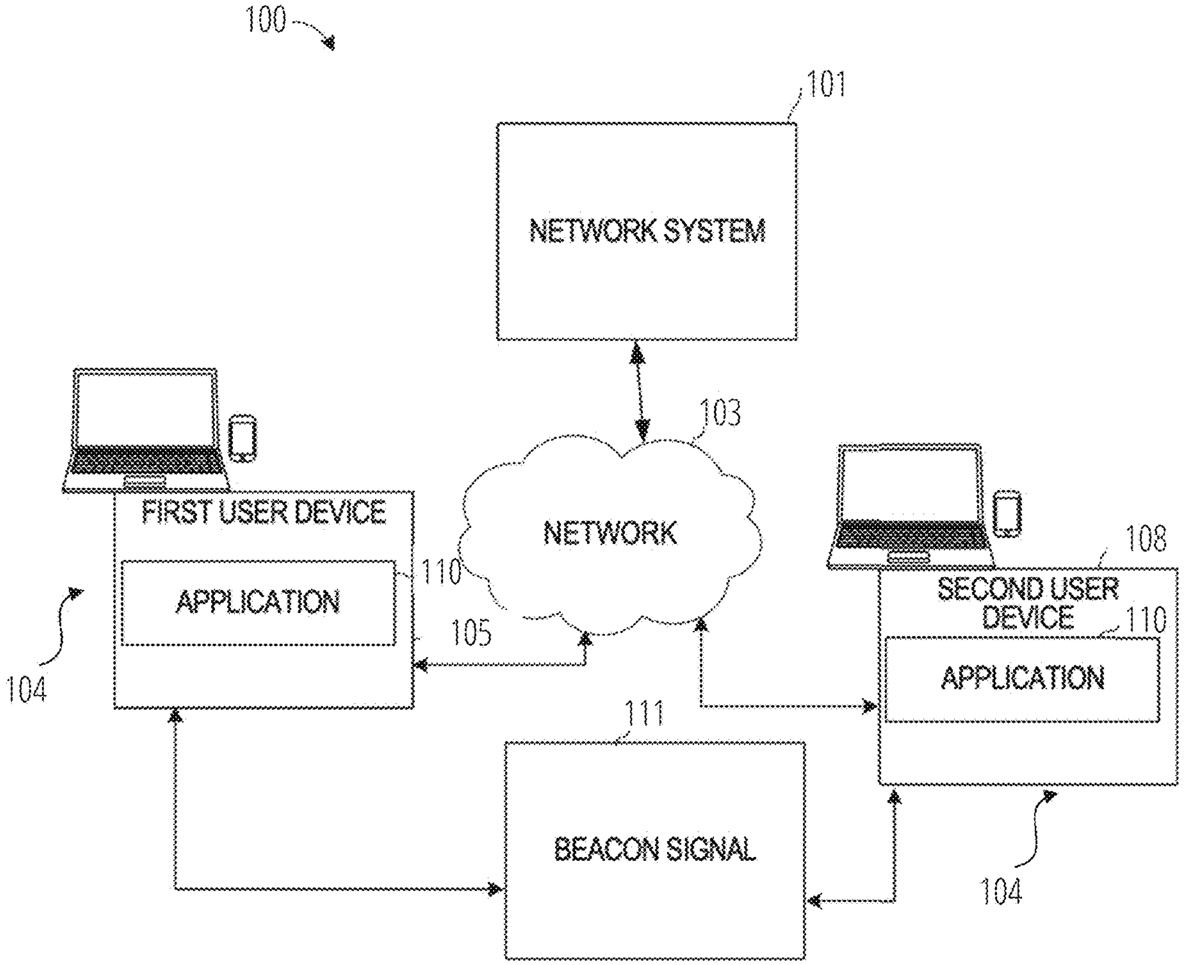
FIG. 1 is a diagram illustrating a network environment suitable for providing co-presence estimation, according to some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Typical systems determine whether certain users/devices are co-present or collocated using global positioning system (GPS) information. However, GPS information may not be specific or accurate enough in certain environments. This is especially true in urban areas or urban canyons where high buildings can interfere with satellites or when devices are placed indoors and have no access to the GPS signals. Because GPS may not be accurate on mobile devices, it is not always reliable. Thus, it may be difficult to determine if two user devices are close together or co-located. As such, these systems usually rely on external factors, such as express user input, to detect presence or co-presence of two individuals or two or more devices. While this manner of detecting co-presence generally works, relying on express user input to be provided can add significant delay, which provides inaccurate predictions.

In some cases, users may forget to provide such input, indicating that they have arrived/departed from a location, which can skew the data that is being aggregated and/or can result in erroneous fare computations. This can result in inefficient use of resources and can frustrate end users who are relying on durations or fares computed based on such manual user input. The reliance on users providing express input to derive or compute durations of time spent at locations and/or completing a trip is also prone to misuse and/or fraud. For example, a user can indicate a trip has begun early or ended later than it actually did, which can cause fraudulent fares to be computed. There are no known systems that accurately estimate/predict co-presence to automate the process of computing how long users spend together and/or at certain locations.

A co-presence presentation system is described herein to accurately detect co-presence and address the above-mentioned and other technical problems. In one use case, co-presence is used to determine if a rider and driver are co-located (e.g., in the same vehicle) for a ride-sharing service. If the rider and driver are co-located, then a trip (e.g., transportation service from a pickup location to a drop-off location) can start. If the rider and driver are not co-located, the co-presence presentation system can help the rider and driver find each other. Conversely, if the rider and driver are no longer co-located after previously being co-located, then the trip is marked as completed, which can be used to resolve fare disputes or automatically end tracking of the trip. In a further use case, co-presence is used to provide a safety notification (e.g., using haptic feedback) should a rider get into a wrong vehicle or, conversely, into a correct vehicle. In a delivery use case, co-presence is used to detect that a courier has arrived at a facility to pick up goods (e.g., food) for delivery to a consumer. Because GPS may not always be reliable or be accurate, the disclosed examples provide a more robust system that can provide accurate co-presence determination.

In various examples, WiFi, Bluetooth, Bluetooth low energy (BLE), and/or ultra-wideband signals are used. Additionally, examples can easily be extended to new communication protocols that involve large numbers of local devices that emit low-power identifiers. According to the disclosed techniques, a first device associated with a first user detects a beacon signal generated by a second device associated with a second user. The beacon signal can be generated by any one or combination of the above signal transmission channels (e.g., WiFi, Bluetooth, BLE, and/or ultra-wideband signals). The disclosed techniques determine that the first device and the second device are co-present based on detecting the beacon signal, such as if a signal strength (e.g., received signal strength indicator (RSSI)) transgresses a threshold. The disclosed techniques, based on determining that the first device and the second device are co-present, compute a duration representing how long the first device and the second device remained co-present. This can be performed by measuring how long the RSSI transgressed the threshold before being determined to fail to transgress the threshold. The disclosed techniques then perform one or more operations based on the duration representing how long the first device and the second device remained co-present.

In some examples, the disclosed techniques can compute a fare (the amount paid by a rider or the amount paid to a driver) based on the duration of time, determine when a trip starts/stops, compute how long it takes for a facility (e.g., restaurant or store) to prepare goods for pick up by a courier to deliver to a consumer, and/or any combination thereof. In some cases, the computed duration is aggregated across multiple devices that pick up goods from the same facility to train a prediction model to accurately predict how long the facility takes to prepare goods for delivery or pickup.

The disclosed techniques provide a novel approach to improving efficiency and reducing waste of resources in transportation and delivery services through advanced co-presence detection and user interface enhancements. This innovative system utilizes beacon signals and sophisticated proximity detection to create a more seamless and intuitive experience for both riders and drivers. By detecting beacon signals from a second device associated with a driver, the first device (associated with a rider) can generate precise co-presence information representing the proximity between the two parties. This real-time proximity data is then translated into a user-friendly graphical interface, featuring a map portion and a co-presence portion with carefully selected graphical indicators. This visual representation allows users to quickly and easily understand their relative positions, significantly reducing confusion and wasted time during pickup scenarios.

The system's ability to trigger scanning for signals and utilize various transmission devices (Wi-Fi, Bluetooth, or ultra-wide band) ensures compatibility across different environments and device types, maximizing its effectiveness and reach. Furthermore, the method's capability to determine when a beacon signal is beyond detection range and adjust the display accordingly prevents unnecessary battery drain and processing power usage on the user's device. The dynamic nature of the proximity GUI, which can swap information display locations and update graphical indicators based on changing proximity levels (far, near, and immediate), provides users with an intuitive understanding of their situation as it evolves. This real-time feedback mechanism, potentially enhanced with animations and distance-specific indicators, reduces the cognitive load on users and minimizes the likelihood of missed connections or confusion during the pickup process.

As referred to herein, "near" proximity or likelihood represents a distance between the first and second devices that is less than 5 meters but greater than 0.5 meters. This corresponds to a "near" likelihood of co-presence, where the beacon signal is detected with a signal strength that transgresses a second threshold but fails to transgress a first threshold. "Far" proximity or likelihood represents a distance between the first and second devices that is less than 50 meters but greater than 5 meters and within the range of beacon signal detection. This corresponds to a "far" likelihood of co-presence, where the beacon signal is detected with a signal strength that transgresses a third threshold but fails to transgress the first and second thresholds. "Immediate" proximity or likelihood refers to a distance between the first and second devices that is less than 0.5 meters. This corresponds to an "immediate" likelihood of co-presence, where the beacon signal is detected with a signal strength that transgresses the first threshold. These definitions are based on the system's use of received signal strength indicator (RSSI) measurements and multiple thresholds to determine the likelihood of co-presence between devices. The specific distance values (50 meters, 0.5 meters, and 5 meters) are examples that can be adjusted based on the specific implementation and requirements of the system.

The dynamic nature of the proximity GUI significantly enhances the user experience and improves efficiency in several ways. By adaptively swapping information display locations based on changing proximity levels (far, near, and immediate), the GUI ensures that the most relevant information is prominently displayed at each stage of the interaction. For example, as the driver gets closer, the GUI transitions from showing estimated arrival times to more immediate proximity indicators, providing users with the most pertinent information at each moment.

The GUI updates graphical indicators in real-time based on the changing proximity levels, using different animations, colors, and sizes for indicators representing far, near, and immediate proximity. These visual cues provide users with an intuitive understanding of their situation as it evolves, without requiring them to interpret complex data. By presenting information through clear, visual indicators that change dynamically, the GUI reduces the cognitive effort required from users to understand their current situation. The real-time updates and clear visual indicators minimize the likelihood of missed connections or confusion during the pickup process. Users can easily track the approaching driver and prepare for the pickup at the appropriate time. The GUI incorporates animations that draw attention to important changes, such as transitioning between proximity states or swapping information sets. These animations help users notice and understand the evolving situation more effectively.

As the proximity changes, the GUI adjusts not only the visual indicators but also the type and arrangement of information presented. For instance, it may switch from showing navigation directions to displaying driver information as the pickup becomes imminent. By dynamically adjusting the information displayed based on proximity, the GUI makes efficient use of limited screen space on mobile devices. This ensures that users always have access to the most relevant information without cluttering the interface. The GUI effectively combines information from various sources, including GPS coordinates, beacon signal strength, and estimated arrival times, presenting this complex data in a simple, user-friendly format. By implementing these features, the proximity GUI significantly improves the user experience, reduces potential errors and misunderstandings, and ultimately enhances the efficiency of the transportation or delivery service The integration of Ultra-Wideband (UWB) technology for determining precise direction and distance between devices further enhances the system's efficiency. By providing real-time feedback on the direction to the other device and the distance between them, users can navigate to each other with unprecedented accuracy, reducing wasted time and fuel spent searching for one another. Overall, the disclosed system significantly improves the efficiency of transportation and delivery services by reducing wait times, minimizing missed connections, and providing clear, actionable information to both parties involved in a pickup or delivery scenario. By leveraging advanced technology to create an intuitive and responsive user interface, the disclosed examples greatly reduce wasted resources, including time, fuel, and cognitive effort, in a wide range of transportation and logistics applications.

FIG. 1 is a diagram illustrating a network environment 100 suitable for providing co-presence duration estimation, according to some examples. The network environment 100 includes a network system 101 communicatively coupled via a network 103 to a first user device 105 and a second user device 108 (collectively referred to as "user devices"). The first user device 105 may be a device of a user, courier, or rider for a transportation service, while the second user device 108 is a device of a service provider, facility device (e.g., restaurant or store device), or driver for the transportation service.

In examples, the network system 101 includes components that obtain and analyze scans received from the user devices 104 to determine co-presence of the user devices 104. The components of the network system 101 are described in more detail in connection with FIG. 2 and may be implemented in a computer system, as described below with respect to FIG. 8. While some examples are described in the context of a transportation service (e.g., to transport a person), examples may also be used in delivery services (e.g., to deliver an item, such as food), whereby the first user device 105 is a device of a recipient (consumer) and the second user device 108 is a device of a courier.

The disclosed examples relate to the user devices 104 continuously or periodically transmitting a beacon signal 111. However, in some cases, with express permission by a user of the first user device 105, the first user device 105 can also or alternatively transmit the beacon signal to allow for mutual detection/determination of co-presence between the first user device 105 and the second user device 108. The beacon signal 111 can be generated using any short-range communication system or device. For example, the beacon signal 111 can be generated using BLE, WiFi, and/or ultra-wide band emitting device.

The components of FIG. 1 are communicatively coupled via the network 103. One or more portions of the network 103 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 103 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In examples, the user devices 104 are portable electronic devices such as smartphones, tablet devices, wearable computing devices (e.g., smartwatches), or similar mobile devices. Alternatively, the user device 109 of the service provider can correspond to an on-board computing system of a vehicle or stationary device at a physical facility (e.g., store, office, or restaurant). The user devices 104 each includes one or more processors, memory, touch screen displays, wireless networking system (e.g., IEEE 802.11), short-range networking system (e.g., BLE devices), cellular telephony support (e.g., LTE/GSM/UMTS/CDMA/HSDPA), and/or location determination capabilities.

The user devices 104 interact with the network system 101 through an application 110 stored thereon. The application 110 of the user devices 104 allows for exchange of information with the network system 101 via user interfaces (UIs), as well as in the background. For example, the application 110 running on the user devices 104 can scan or search for beacon signals 111 in their environment, transmit the beacon signal 111 for detection by other devices, transmit information to the network system 101, and/or receive a notification of co-presence (or lack of co-presence) from the network system 101.

In some examples, the application 110 is triggered by the network system 101 to perform the scan for the beacon signal 111. The network system 101 and/or the application 110 of the first user device 105 that detects the beacon signal 111 then uses the scans to determine whether the user devices 104 are co-present and triggers a component of the network system 101 to perform a corresponding operation.

For example, the user device detects the beacon signal 111 transmitted by the second user device 108 and measures the RSSI of the beacon signal 111. If the measured RSSI of the beacon signal 111 transmitted by the second user device 108 transgresses a threshold, the first user device 105 determines that the first user device 105 is co-present with the second user device 108. In some cases, the first user device 105 generates a likelihood of co-presence ranging from immediate, near, far and none (each associated with a different range of RSSI values). An immediate likelihood is determined if the RSSI transgresses a first threshold; a near likelihood is determined if the RSSI transgresses a second threshold but fails to transgress the first threshold; the far likelihood is determined if the RSSI transgresses a third threshold but fails to transgress the first and second thresholds; and none likelihood is determined if the RSSI fails to transgress the first, second and third thresholds.

In some examples, the likelihood of co-presence between the first user device 105 and the second user device 108 is used to help a rider find a driver. For example, a user interface can be presented on the user devices that includes a map of different vehicles (e.g., vehicle identifiers or icons), each corresponding to a different user devices 104. The first user device 105 can determine the likelihood of co-presence between the first user device 105 and the user devices 104 of each vehicle within a certain distance of the first user device 105. Based on the likelihoods, the user interface can color or display some other visual indicator on each vehicle identifier that is presented on the map and/or can generate haptic feedback. Namely, a first vehicle identifier that is associated with an immediate likelihood of co-presence can be presented in a first color and a second vehicle identifier that is associated with a near likelihood of co-presence can be presented in a second color. This can be provided together with haptic feedback of a first type. This can help the user identify and find the driver that is associated with a trip requested by the user and make sure that the driver the user intends to use is the correct one (e.g., based on the color corresponding to the immediate likelihood of co-presence).

In some examples, a determination is made that the first vehicle is associated with a different trip than the one requested by the user of the first user device 105. In such cases, the first vehicle is presented in a color (e.g., red) indicating it is the wrong vehicle, even though the first vehicle is associated with the immediate likelihood of co-presence, to alert the user that the first vehicle is associated with a different trip. The second vehicle can be determined to be associated with the trip requested by the user, and, in such cases, the second vehicle identifier can be presented with the first color instead of the second color even though the second vehicle is associated with the near likelihood of co-presence to help the user find the second vehicle and enter the correct vehicle. Similar techniques can be applied to help the driver find a rider.

In some examples, if the user devices 104 are determined to be co-present (e.g., if the likelihood is immediate), a notification is transmitted to each user device indicating the co-presence. In such cases, a duration representing how long each of the user devices 104 remains co-present is computed. For example, likelihoods of co-presence are periodically or continuously computed by the user devices 104. Namely, the first user device 105 continues to determine whether the RSSI of the beacon signal 111 transmitted by the second user device 108 corresponds to an immediate likelihood of co-presence. In response to determining (after having determined that the first user device 105 and the second user device 108 are co-present with an immediate likelihood, which starts a trip), that the first user device 105 and the second user device 108 are co-present with a near, far, or none likelihood, the network system 101 and/or the first user device 105 determine the end of the co-presence or the end of a trip. The network system 101 computes a difference between the start of the trip time and the end of the trip time to compute the duration of time that the user devices 104 were co-present.

In some examples, this computed duration is used to adjust or verify accuracy of a fare associated with a trip. In some examples, the duration is used to determine how long a courier spends at a facility. Multiple such duration determinations can be collected or aggregated across various user devices 104 that pick up goods from the same facility. These durations can be aggregated into a collection of durations that represent how long goods take to prepare for pick up at the facility. These durations are then fed as training data into an item preparation duration model (e.g., an artificial neural network or convolutional neural network) to predict how long goods take to prepare for pick up at the facility.

In examples, a first user (e.g., a requester or rider) operates the first user device 105 that executes the application 110 to communicate with the network system 101 to make a request for a transportation service such as transport or delivery service (referred to collectively as a "trip"). The application 110 determines or allows the user to specify/select a pickup location or point (e.g., of the user or an item to be delivered) and to specify a drop-off location or point for the trip. The application 110 can also present notifications indicating co-presence (e.g., "You are in the wrong vehicle;" "You are in the correct vehicle and your trip has begun;" "You are moving towards your pick-up vehicle."). In some examples, the application 110 can provide any of the disclosed notifications using haptic feedback in addition to or alternative to using displayed notifications. For example, one type of haptic feedback (e.g., a first type of vibration) can be provided to indicate different likelihoods of co-presence and/or that the user is in a wrong vehicle. Another type of haptic feedback (e.g., a second type of vibration) can be provided to indicate that the user is in a correct vehicle.

In some examples, another type of haptic feedback can be provided to assist the user to reach a certain vehicle. For example, as the likelihood of co-presence increases from no co-presence to near co-presence, the intensity of the haptic feedback can be adjusted (e.g., increased or decreased). Namely, the haptic feedback can begin with a first intensity when no co-presence is detected between the first user device and the second user device. As the first user device comes closer to the second user device, such as when the likelihood of co-presence becomes near, the haptic feedback can increase to a second intensity. Then, as the first user device continues coming closer to the second user device, such as when the likelihood of co-presence becomes immediate from being near, the haptic feedback can increase to a third intensity.

A second user (e.g., a service provider or driver) operates the second user device 108 to execute the application 110 that communicates with the network system 101 to exchange information associated with providing transportation service (e.g., to the user of the requester device 107). The application 110 presents information via user interfaces (UIs) to the user of the second user device 108, such as invitations to provide the transportation service, a route and navigation instructions to a pickup point of the user (e.g., rider) or item, and a route and navigation instructions to a drop-off point for the user or item. The application 110 can also present notifications indicating co-presence (e.g., "Your rider is approaching;" "You have arrived at your delivery location.") and/or generate haptic feedback with different intensity and patterns. The application 110 also provides data to the network system 101 such as a current location (e.g., coordinates such as latitude and longitude), speed, and/or heading of the second user device 108 or vehicle.

In examples, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 104 may be embodied within the network environment 100, and any number, type, or combination of number and/or types of beacons 112 can be embodied within the network environment 100. Furthermore, some components or functions of the network environment 100 may be combined or located elsewhere in the network environment 100. For example, some of the functions of the network environment 100 may be embodied within other systems or devices of the network environment 100. Additionally, some of the functions of the user device may be embodied within the network environment 100. While only a single network environment 100 is shown, alternative examples may contemplate having more than one network environment 100 to perform server operations discussed herein for the network environment 100.

Figure 2:
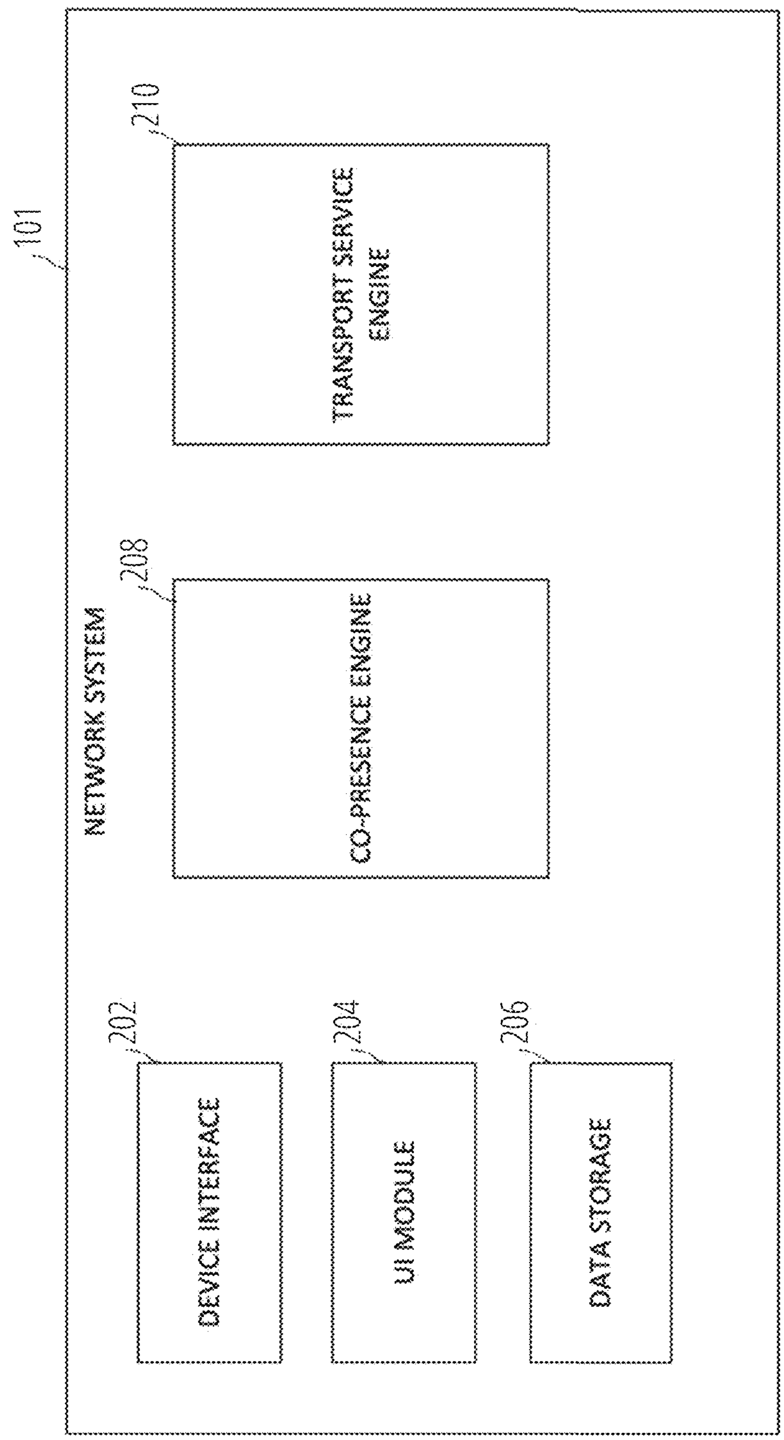
FIG. 2 is a block diagram illustrating components of a network system for providing co-presence estimation, according to some examples.

FIG. 2 is a block diagram illustrating components of the network system 101 for providing co-presence duration estimation, according to some examples. In various examples, the network system 101 detects, by a first device associated with a first user, a beacon signal 111 generated by a second device associated with a second user. The network system 101 determines that the first device and the second device are co-present based on detecting the beacon signal. The network system 101, based on determining that the first device and the second device are co-present, computes a duration representing how long the first device and the second device remained co-present and performed one or more operations based on the duration, representing how long the first device and the second device remained co-present.

To enable these operations, the network system 101 includes a device interface 202, a UI module 204, a data storage 206, a co-presence engine 208, and a transport service engine 210 all configured to communicate with each other (e.g., via a bus, shared memory, or a switch). The network system 101 may also include other components (not shown) that are not pertinent to examples. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices (shown in FIG. 1) and cause presentation of one or more UIs provided by the UI module 204 on the user devices 104 (e.g., via the application 110) including UIs to initiate a request for transportation service, select a pickup location and drop-off location, identify a facility from which to obtain goods for pick up, and display a route or path to navigate to the pickup location and the drop-off location.

In some examples, the UIs provide an indication of co-presence (or lack of co-presence) of the user devices in real time. The indication can be based on real-time information representing direction between the user devices and distance between the user devices. The indication can be generated based on a bidirectional UWB link established between the user devices, such as by the co-presence engine 208. Specifically, UWB is a wireless communication protocol that uses radio waves to transmit data over a wide frequency range. Establishing a UWB link between devices involves a series of steps to ensure secure and precise communication. Initially, the user devices perform a handshake protocol where they exchange information such as device identifiers and supported UWB channels. This process may also involve authentication procedures to ensure that the user devices attempting to establish a connection are permitted to do so.

Once the handshake is complete and the user devices are authenticated, they can begin the process of ranging, which is used to determine the distance and direction between the user devices. The user devices send short pulses of radio waves at regular intervals across a broad spectrum of frequencies. These pulses are extremely short in duration, typically lasting only a few nanoseconds, which allows UWB to achieve high temporal resolution and accuracy in measuring the time of flight (ToF) of the signals. To measure distance, a user device 104 sends a signal to another user device and records the time it takes for the signal to be received back after being acknowledged. This ToF measurement is then multiplied by the speed of light to calculate the distance between the two user devices, considering that radio waves travel at the speed of light. UWB's high bandwidth allows for precise ToF measurements, resulting in accurate distance estimations, often with an accuracy of a few centimeters. For determining the direction, UWB systems can use the angle of arrival (AoA) technique, where multiple antennas on the receiving device capture the incoming signal. The difference in signal arrival times at each antenna, known as the phase difference, is used to calculate the angle from which the signal is arriving. By combining distance measurements with AoA information, the user devices can effectively determine the relative position of other user devices 104 in three-dimensional space. In some examples, when UWB links fail after and/or before being established, the user devices fall back to using GPS, Bluetooth, or other communication or signal protocols.

In some examples, the UIs provide an indication of co-presence (or lack of co-presence) of the user devices. The UIs can also or alternatively present the likelihoods of co-presence (e.g., immediately co-present, near, far, or none) and trigger different types of haptic feedback representing the likelihoods of co-presence. The device interface 202 may also receive data including scans and trip data from the user devices before, during, and after a trip. The trip data can include location information such as GPS traces (e.g., latitude and longitude with timestamp), speed, times associated with each trip, and feedback for the transportation service. The scans and trip data may be received from the user devices in real-time, for example as the user is traveling (or navigation to a destination) during the trip. The scans and/or trip data are stored to the data storage 206 by the device interface 202.

The data storage 206 is configured to store information associated with each user of the network environment 100, including the trip data and a user account/profile. The stored information includes, for example, past trips, saved or frequently selected destinations (e.g., home, work), and user preferences. In some examples, the trip data is stored in or associated with the user profile corresponding to each user and includes a history of interactions using the network environment 100. While the data storage 206 is shown to be embodied within the network system 101, alternative examples can locate the data storage 206 elsewhere and be communicatively coupled to the network environment 100.

The co-presence engine 208 is configured to manage co-presence determination and duration computation. In some examples, the co-presence engine 208 initiates a search by the application 110 of the first user device 105 for the beacon signal 111 transmitted by the second user device 108. Specifically, the first user device 105 can receive input from a first user requesting to be picked up by a vehicle at a certain location. In response to this input, the co-presence engine 208 instructs the first user device 105 to begin searching for the beacon signal 111 associated with the second user device 108. In some cases, the first user device 105 begins searching for the beacon signal 111 in response to determining that current GPS coordinates of the second user device 108 are within a threshold distance (e.g., 100 feet or less) of the current location of the first user device 105.

The first user device 105 can detect the beacon signal 111 that is transmitted by the second user device 108. In response, the first user device 105 compares the RSSI of the beacon signal 111 to one or more thresholds to determine a likelihood of co-presence between the first user device 105 and the second user device 108. In response to determining that the likelihood of co-presence corresponds to immediate likelihood, the co-presence engine 208 stores a trip start time for the trip requested by the first user. The co-presence engine 208 can instruct the first user device 105 to stop searching for the beacon signal 111 while the first user device 105 is on the trip. Specifically, the co-presence engine 208 can communicate with the transport service engine 210 to obtain a route associated with the trip. The co-presence engine 208 can use GPS coordinates obtained from the second user device 108 to verify that the user device 109 is progressing along the route associated with the trip. The co-presence engine 208 can determine that the current GPS coordinates obtained from the second user device 108 are within a threshold proximity (e.g., 50 feet) of a destination of the trip. In response, the co-presence engine 208 instructs the first user device 105 to begin searching for the beacon signal 111 transmitted by the second user device 108. The second user device 108 can continuously and persistently be transmitting the beacon signal 111 before, throughout the entire duration of the trip, and after the trip.

The first user device 105 can again detect the beacon signal 111 that is transmitted by the second user device 108. In response to detecting the beacon signal 111, the first user device 105 compares the RSSI of the beacon signal 111 to one or more thresholds to determine a likelihood of co-presence between the first user device 105 and the second user device 108. The first user device 105 can continue comparing the RSSI for a threshold period of time (e.g., 10 minutes) and/or until the RSSI of the beacon signal 111 falls below a threshold indicating the likelihood of co-presence is near rather than immediate. In such cases, the first user device 105 can transmit a message to the co-presence engine 208 indicating the time when the likelihood of co-presence fell to near from immediate. The co-presence engine 208, in response, stores an end time for the trip. The co-presence engine 208 can compute the trip duration based on a difference between the start time and the end time. The co-presence engine 208 can provide the trip duration, the start time and the end time to the transport service engine 210.

The transport service engine 210 obtains trip information associated with the trip taken by the first user. The transport service engine 210 can obtain this trip information based on manual user inputs received from a second user of the second user device 108. Specifically, the second user device 108 can select an option indicating start of the trip when the first user enters the vehicle associated with the trip. Similarly, the second user device 108 can select an option indicating end of the trip when the first user leaves the vehicle associated with the trip or when the destination is reached. This information is stored in the trip information and can be used to compute a trip duration determined by the inputs from the second user.

The transport service engine 210 can compare the start time of the trip determined by the co-presence engine 208 with the start time of the trip indicated by the second user of the user devices 104. If the two start times are within a threshold difference of each other, the transport service engine 210 determines that no fraud is present or detected. If the two start times are not within the threshold difference (e.g., two minutes) of each other, the transport service engine 210 determines that possible fraud is present or detected. In such cases, the transport service engine 210 can update a profile associated with the second user to determine whether a pattern of behavior indicates fraud. If multiple instances of such fraud are determined for the same second user, the transport service engine 210 can alert the second user and/or can alert a service provider about the fraud.

The transport service engine 210 can compare the end time of the trip, determined by the co-presence engine 208, with the end time of the trip indicated by the second user of the user devices 104. If the two end times are within a threshold difference of each other, the transport service engine 210 determines that no fraud is present or detected. If the two end times are not within the threshold difference (e.g., four minutes) of each other, the transport service engine 210 determines that possible fraud is present or detected. In such cases, the transport service engine 210 can update a profile associated with the second user to determine whether a pattern of behavior indicates fraud. If multiple instances of such fraud are determined for the same second user, the transport service engine 210 can alert the second user and/or can alert a service provider about the fraud by flagging the second user device 108 for review. In response to determining that the two durations are different from each other by some threshold (e.g., five minutes), the transport service engine 210 can recompute and adjust a fare (e.g., increase or decrease the fare) initially provided to the first user when the trip began or just prior to when the trip began. The transport service engine 210 can also generate a message or prompt for presentation on the first user device 105 of the first user in a UI.

Figure 3:
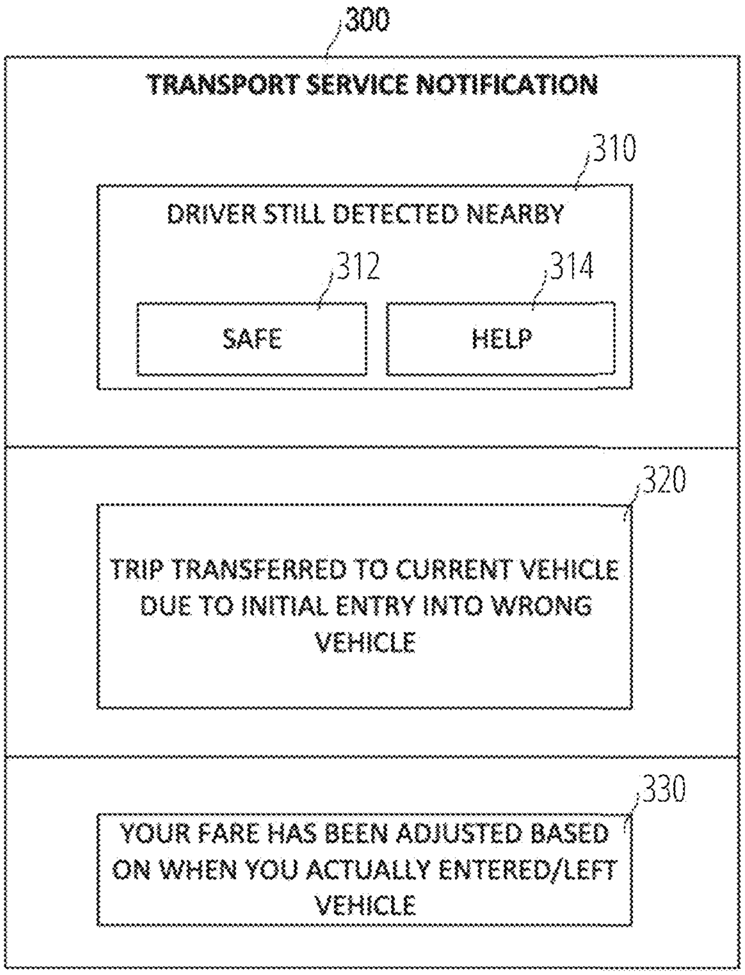
FIG. 3 shows an example output of the network system, according to some examples.

The transport service engine 210 can compare the duration of the trip determined by the co-presence engine 208 with the duration of the trip computed based on inputs received from the second user of the user devices 104. If the two durations are within a threshold difference of each other, the transport service engine 210 determines that no fraud is present or detected. If the two durations are not within the threshold difference (e.g., three minutes) of each other, the transport service engine 210 determines that possible fraud is present or detected. In such cases, the transport service engine 210 can update a profile associated with the second user to determine whether a pattern of behavior indicates fraud. If multiple instances of such fraud are determined for the same second user, the transport service engine 210 can alert the second user and/or can alert a service provider about the fraud by flagging the second user device 108 for review. In response to determining that the two durations are different from each other by some threshold (e.g., five minutes), the transport service engine 210 can recompute and adjust a fare (e.g., increase or decrease the fare) initially provided to the first user when the trip began or just prior to when the trip began. The transport service engine 210 can also generate a message or prompt 330 for presentation on the first user device 105 of the first user in a UI 300, as shown in FIG. 3.

In some examples, the transport service engine 210 can track the co-presence duration likelihoods for a trip taken by a given user. The transport service engine 210 can use the tracked co-presence duration likelihoods to automate a decision associated with customer support tickets. For example, if a customer support ticket or request is received indicating a review for a fare or cancelation, the transport service engine 210 can access the co-presence duration likelihoods to determine a resolution to the request.

In some examples, the transport service engine 210 can determine when the likelihood of co-presence is immediate or near between rider and driver devices. In such cases, the transport service engine 210 can identify GPS locations or positions on a map associated with the first user device 105 or second user device 108 when the likelihood of co-presence was determined to be immediate or near. The transport service engine 210 can increment a counter associated with the GPS location or position on the map in response to determining the location when the devices were in the immediate or near co-presence likelihood. The transport service engine 210 can determine whether the counter transgresses a minimum value to generate a heatmap of hotspot locations for pickup zones. Namely, if the counter transgresses a minimum value, the transport service engine 210 can specify that location as a hotspot pickup/drop-off location and select that location for a driver or rider to use in subsequent trips. This way, the transport service engine 210 uses the co-presence to detect more accurately the spots where drivers picked up riders on previous trips in order to generate better locations for pickups or drop offs.

In some examples, the transport service engine 210 utilizes the likelihood of co-presence to unlock a transportation vehicle or unlock a door to allow access to an item. For example, the transportation vehicle can include an autonomous vehicle. The transport service engine 210 can instruct the autonomous vehicle to automatically navigate to a pickup location associated with a rider. Upon reaching the location, the transport service engine 210 instructs the autonomous vehicle to transmit a beacon signal. The transport service engine 210 instructs the first user device 105 of the rider to monitor for a beacon sign. The transport service engine 210 computes a co-presence likelihood score between the rider and the autonomous vehicle based on the beacon signal strength. In response to determining that the co-presence likelihood corresponds to a near or immediate likelihood, the transport service engine 210 instructs the autonomous vehicle to unlock a passenger door to allow the rider to enter the autonomous vehicle. While the co-presence likelihood is not near or immediate, the transport service engine 210 instructs the autonomous vehicle to keep the doors locked.

In some examples, as discussed above and below, a trip associated with the autonomous vehicle can automatically be started and ended using the likelihood of co-presence alone or together with other signals. For example, simultaneously with unlocking the door, the autonomous vehicle can start a trip (e.g., to begin charging a fare to the passenger) in response to determining that the co-presence likelihood corresponds to a near or immediate likelihood. Then, after the autonomous vehicle reaches a destination, the autonomous vehicle can automatically end the trip (e.g., to conclude charging the fare or for computing the fare total), in response to determining that the co-presence likelihood no longer corresponds to the near or immediate likelihood and corresponds to a far or none co-presence likelihood.

Similarly, the transport service engine 210 can communicate with a locker that contains an item for pickup by a courier. The transport service engine 210 can compute a co-presence likelihood score between the courier and the locker based on a beacon signal strength transmitted by a user device of the locker. In response to determining that the co-presence likelihood corresponds to a near or immediate likelihood, the transport service engine 210 can instruct the locker to unlock to allow the courier to pick up the item in the locker.

In some examples, the transport service engine 210 can detect possible safety issues or concerns based on detecting co-presence between the first user of the first user device 105 and the second user device 108 after a destination is reached and/or after the second user of the second user device 108 indicates an end to the trip. Specifically, the transport service engine 210 can instruct the co-presence engine 208 to collect and compute co-presence information after a destination is reached and/or after the second user of the second user device 108 indicates an end to the trip. The co-presence engine 208 can instruct the second user device 108 to continue detecting RSSI for the beacon signal 111 associated with the first user device 105 after the likelihood is determined that the first user device 105 is near second user device 108.

Specifically, the co-presence engine 208 can first determine that the first user device 105 and the second user device 108 are in immediate likelihood of co-presence to start a trip. Then, the co-presence engine 208 can determine that the first user device 105 and the second user device 108 are in near likelihood of co-presence to end a trip. If, after determining that the first user device 105 and the second user device 108 are in near likelihood of co-presence (after having been immediately co-present) or far likelihood of co-presence, after a destination is reached, for more than a threshold period of time (e.g., for more than three minutes), the co-presence engine 208 can initiate a safety process involving safety operations. This safety process may be needed because the driver may be lingering around a location associated with a destination of the rider.

In some examples, in response to determining that the driver may be lingering around a location, the co-presence engine 208 generates an alert 310 for presentation on the first user device 105 of the first user in the UI 300, as shown in FIG. 3. The alert 310 (or certain type of haptic feedback) can indicate or inform the first user that the second user (e.g., the driver) is still nearby and can provide a set of options. The alert 310 can include a first option 312 indicating that the first user is safe. Selection of the first option 312 can dismiss the monitoring and terminate monitoring of the beacon signal 111 by the first user device 105. The alert 310 can include a second option 314 to call for help. Selection of the second option 314 can cause the transportation manager of the transport service engine 210 to be notified about the possible safety issue, call the police, and/or call a designated friend of the first user of the first user device 105.

In some examples, the co-presence engine 208 automatically exchanges and/or transfers routes from one user device to another user device, such as if a rider is determined to be co-present with a wrong or incorrect driver. For example, the first user device 105 of a first user (e.g., a rider) receives a request to be picked up from an urban location (e.g., an airport) where multiple vehicles are being summoned to pick up riders. The co-presence engine 208 instructs the first user device 105 to begin searching for the beacon signal 111 of the second user device 108. The first user device 105 detects multiple beacon signals 111 associated with multiple user devices 104. In such cases, the first user device 105 computes estimated likelihoods of co-presence for each of the detected multiple beacon signals 111. The first user device 105 can predict that the first user device 105 is co-present with a particular one of the user devices 104 that is associated with an immediate likelihood rather than being co-present with another one of the user devices 104 associated with a near likelihood.

The co-presence engine 208 can instruct the first user device 105 to again search for the beacon signal 111 associated with the particular one of the user devices 104 during the trip, such as after a threshold period of time (e.g., three minutes) from when the trip has been started (by the user of the second user device 108 and/or by the detection of immediate co-presence between the first user device 105 and the second user device 108). The first user device 105 again computes a likelihood of co-presence based on the RSSI of the beacon signal 111 that has been detected by the first user device 105 during the trip. In this case, the first user device 105 determines that the co-presence likelihood is still immediate. In such cases, the co-presence engine 208 determines that the first user of the first user device 105 has entered the correct vehicle and is co-present with the correct driver that was assigned to the first user when the trip was requested.

In some examples, the first user device 105 determines that the co-presence likelihood of the first user device 105 and the second user device 108 in the vehicle in which the user is currently riding is below a threshold and is "none" or "far" likelihood after having been "immediate" likelihood. This may be because the first user device 105 initially detected the beacon signal 111 of a second user device 108 of a different driver in a vehicle that is different from that in which the rider has entered. Since that beacon signal 111 is no longer present or is farther away, the RSSI that is computed by the first user device 105 falls below a threshold to correspond to a likelihood that was immediate to near being none or far. Specifically, when the trip is started, the first user device 105 stores a beacon identifier for the beacon signal 111 that was initially detected and associated with an immediate likelihood of co-presence between the first user device 105 and the second user device 108. When the co-presence engine 208 instructs the first user device 105 to search for the beacon signal 111, the first user device 105 searches for the beacon signal 111 that is associated with the same beacon identifier. If that beacon signal 111 is no longer detected or is detected with a reduced RSSI, the first user device 105 notifies the co-presence engine 208 that the first user entered the wrong vehicle which can trigger haptic feedback corresponding to incorrect entry. If the first user device 105 detects a beacon signal 111 that is associated with a different beacon identifier than the one that was initially stored at the start of the trip, the first user device 105 notifies the co-presence engine 208 that the first user entered the wrong vehicle. In such cases, the co-presence engine 208 instructs the transport service engine 210 that the first user has entered the incorrect or wrong vehicle. The second user device 108 of the driver of the vehicle can be loaded with a route for a trip associated with a different passenger. This may be unbeknownst to the driver.

In response, the transport service engine 210 can search for the trip associated with the first user that was initially requested, which is different from the trip currently loaded on the second user device 108 of the driver of the vehicle in which the rider has entered. The transport service engine 210 can retrieve the trip and can automatically replace the current route loaded in the second user device 108 of the driver with the trip associated with the first user. The transport service engine 210 can present a prompt or alert 320 on the UI 300 of the driver and/or passenger informing them that the trip has been transferred to the current vehicle because the passenger entered the wrong vehicle initially.

In some examples, the co-presence engine 208 uses durations of co-presence between user devices 104 to estimate or predict an item preparation time (e.g., food or good preparation time) at a facility, such as a restaurant or store. For example, the co-presence engine 208 receives input from the first user device 105 of a courier. The input can identify a facility from which the courier plans to pick up an item. The co-presence engine 208 searches for a beacon identifier associated with a beacon signal 111 of the second user device 108 associated with the facility. The co-presence engine 208 provides the beacon identifier to the first user device 105 of the courier.

The first user device 105 can be instructed by the co-presence engine 208 to begin searching for the beacon signal 111 transmitted by the second user device 108 at the facility that has the beacon identifier. In response to detecting the beacon signal 111, the first user device 105 computes an RSSI of the detected signal. The first user device 105 estimates a likelihood of co-presence between the first user device 105 and the second user device 108 of the facility.

In some examples, in response to determining that the likelihood is "near" or "immediate" (e.g., based on measured RSSI values), the second user device 108 of the facility can trigger an audible or visual alert for a staff member at the facility. The audible or visual alert (or haptic feedback of a certain type) can indicate to the staff member that the courier associated with the first user device has arrived at the facility. In some cases, the audible or visual alert is only triggered in response to determining that the duration of time since the first user device 105 has been in the near or immediate likelihood of co-presence with the second user device 108 transgresses a minimum threshold period of time. This can be used to provide a sense of urgency to the staff member based on how long the courier has been waiting at the facility. In some cases, the staff member can use the audible or visual alert to call other couriers during crowded times. For example, if more than a threshold quantity of audible or visual alerts are generated within a specified time interval (e.g., each associated with a different courier having a respective user devices 104), the second user device 108 can inform the staff member to call an upcoming courier to inform the upcoming courier that it is a crowded time, and that delivery of the items will be delayed.

In some examples, in response to determining that the likelihood is near or immediate, the first user device 105 stores a facility arrival time for the item preparation time or duration. In addition, the co-presence engine 208 can automatically perform an operation to validate the pickup of the item in response to determining that the likelihood of co-presence between the courier and facility is "near" or "immediate." The operation can mark the item as being picked up. The co-presence engine 208 can monitor when the item is delivered to a customer and can automatically perform an operation to validate the drop off of the item in response to determining that the likelihood of co-presence between the courier and the customer is "near" or "immediate." The operation can mark the item as "delivered."

In some examples, the transport service engine 210 can determine when the likelihood of co-presence is "immediate" or "near" between courier and customer devices. In such cases, the transport service engine 210 can identify GPS locations or positions on a map associated with the first user device 105 or second user device 108 when the likelihood of co-presence was determined to be immediate or near. The transport service engine 210 can increment a counter associated with the GPS location or position on the map in response to determining the location when the devices were in the "immediate" or "near" co-presence likelihood. The transport service engine 210 can determine whether the counter transgresses a minimum value to generate a heat-map of hotspot locations for points of interest for dropping off items. Namely, if the counter transgresses a minimum value, the transport service engine 210 can specify that location as a popular drop-off location and select that location for a courier or rider to use in subsequent deliveries. These popular locations represent popular locations where couriers and customers met for picking up items and delivering items.

In some examples, the first user device 105 continues monitoring for the beacon signal 111 to detect when the RSSI drops below a threshold associated with far or no co-presence likelihood between the first user device 105 and the second user device 108 of the facility. In such cases, the first user device 105 stores a facility departure time for the item preparation time or duration. The first user device 105 transmits the facility start and departure times to the co-presence engine 208. The co-presence engine 208 can compute a first instance of an item preparation time for the facility based on the facility start and departure times received from the first user device 105.

In some cases, the co-presence engine 208 receives input from another instance of the first user device 105 of a second courier. The input can identify the same facility from which the second courier plans to pick up another item. The co-presence engine 208 searches for a beacon identifier associated with a beacon signal 111 of the second user device 108 associated with the facility. The co-presence engine 208 provides the beacon identifier to the first user device 105 of the second courier.

The first user device 105 can be instructed by the copresence engine 208 to begin searching for the beacon signal 111 transmitted by the second user device 108 at the facility and which has the beacon identifier. In response to detecting the beacon signal 111, the first user device 105 computes an RSSI of the detected signal. The first user device 105 estimates a likelihood of co-presence between the first user device 105 and the second user device 108 of the facility. In response to determining that the likelihood is "near" or "immediate," the first user device 105 stores a facility arrival time for the item preparation time or duration. The first user device 105 continues monitoring for the beacon signal 111 to detect when the RSSI drops below a threshold associated with "far" or "no" co-presence likelihood between the first user device 105 and the second user device 108 of the facility. In such cases, the first user device 105 stores a facility departure time for the item preparation time or duration. The first user device 105 transmits the facility start and departure times to the copresence engine 208. The copresence engine 208 can compute a second instance of an item preparation time for the facility based on the facility start and departure times received from the first user device 105 of the second courier.

In some examples, after the co-presence engine 208 receives more than a threshold quantity of instances of item preparation times (durations) for the facility, the co-presence engine 208 trains a machine learning model (e.g., a neural network and/or convolutional neural network, or item preparation time model) to predict an item preparation time for the facility. The co-presence engine 208 aggregates all of the received instances of the item preparation times into training data. The co-presence engine 208 then trains the item preparation time model to predict an item preparation time for the facility based on training data. For example, the co-presence engine 208 predicts, by the item preparation model, an estimated item preparation time for the facility and retrieves a first item preparation time duration instance from a plurality of item preparation time duration instances of the training data. The co-presence engine 208 computes a deviation between the first item preparation time duration instance and the estimated item preparation time for the facility. The co-presence engine 208 updates one or more parameters of the item preparation time model based on the computed deviation and repeats this process for multiple instances of the item preparation times (or durations). Once a stopping criterion is reached, the co-presence engine 208 can use the item preparation time model to accurately predict how long a courier will spend at the facility to pick up one or more items and can use that prediction to inform a consumer or recipient of the one or more items of the estimated arrival time of the courier.

In some examples, the co-presence engine 208 instructs a first user device 105 of a recipient to begin searching for beacon signal 111 of a second user device 108 of the courier. The co-presence engine 208 can determine whether the first user device 105 and the second user device 108 are co-present with a certain likelihood. For example, the co-presence engine 208 determines that first user device 105 and the second user device 108 are co-present with an immediate likelihood. In such cases, the co-presence engine 208 marks delivery complete for the one or more items delivered by the courier associated with the second user device 108 to the recipient associated with the first user device 105. In some examples, the co-presence engine 208 can store a delivery time indicating when the delivery was complete. The co-presence engine 208 can compare the delivery time with a delivery time received from the second user device 108 based on manual entry by the courier. If the two delivery times are within a threshold of each other (e.g., less than 10 minutes different), the co-presence engine 208 determines that no fraud is present. If the two delivery times are not within a threshold of each other (e.g., less than 10 minutes different), the co-presence engine 208 determines that fraud may be present and can update a profile for the courier to determine whether the courier is associated with a pattern of fraud.

In some examples, the co-presence engine 208 can update portions of a leg of a trip to predict estimated times of arrival. Namely, the co-presence engine 208 can monitor co-presence scores or likelihoods across different portions of a trip. Namely, a trip can include multiple portions, such as passageways through doors, parking at spots, driving along a certain route segment, dropping off items or passengers. The co-presence engine 208 can generate an estimated time of arrival (ETA) and update ETA for each segment of the route based on a determination of whether the corresponding segment is associated with an immediate or near likelihood. If the segment is not associated with the immediate or near likelihood between two devices that are navigating along the segment, the co-presence engine 208 can determine whether a current time is past the ETA of the segment. If so, the co-presence engine 208 extends or updates the ETA for the segment.

Figure 4:
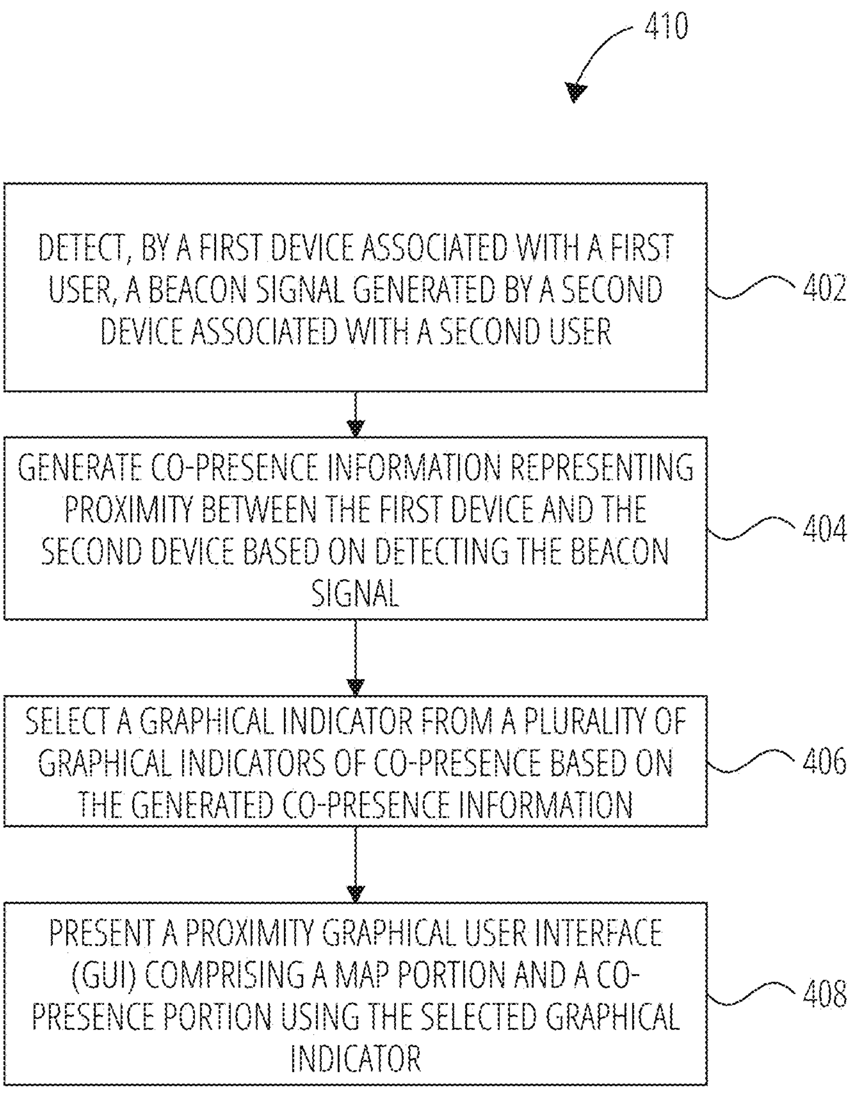
FIG. 4 is a flowchart illustrating operations of a method 410 (or process) for presenting co-presence information, according to some examples

FIG. 4 is a flowchart illustrating operations of a method 410 (or process) for presenting co-presence information, according to some examples. Operations in the method 410 may be performed by the network system 101, using components described above with respect to FIG. 2. Accordingly, the method 410 is described by way of example with reference to the network system 101. However, it shall be appreciated that at least some of the operations of the method 410 may be deployed on various other hardware configurations or be performed by similar components residing elsewhere in the network environment 100. Therefore, the method 410 is not intended to be limited to the network system 101.

In operation 402, the network system 101 detects, by a first device associated with a first user, a beacon signal generated by a second device associated with a second user, as discussed above.

In operation 404, the network system 101 generates co-presence information representing proximity between the first device and the second device based on detecting the beacon signal, as discussed above.

In operation 406, the network system 101 selects a graphical indicator from a plurality of graphical indicators of co-presence based on the generated co-presence information, as discussed above.

In operation 408, the network system 101 presents a proximity graphical user interface (GUI) comprising a map portion and a co-presence portion using the selected graphical indicator. as discussed above.

FIG. 5A, FIG. 5B to FIG. 7 are examples inputs/outputs of the network system, according to some examples. For example, as shown in the example UIs 501 of FIG. 5A, FIG. 5B, the network environment 100 uses an established UWB link between two user devices 104 (e.g., a first device of a rider/passenger and a second device of a driver in a ride-sharing service) to present various feedback in real time. The feedback is presented to the rider/passenger of the first device and represents a direction of the second device and distance between the first and second devices. Specifically, the feedback can include audible feedback, visual feedback, and/or haptic feedback.

Figure 5A:
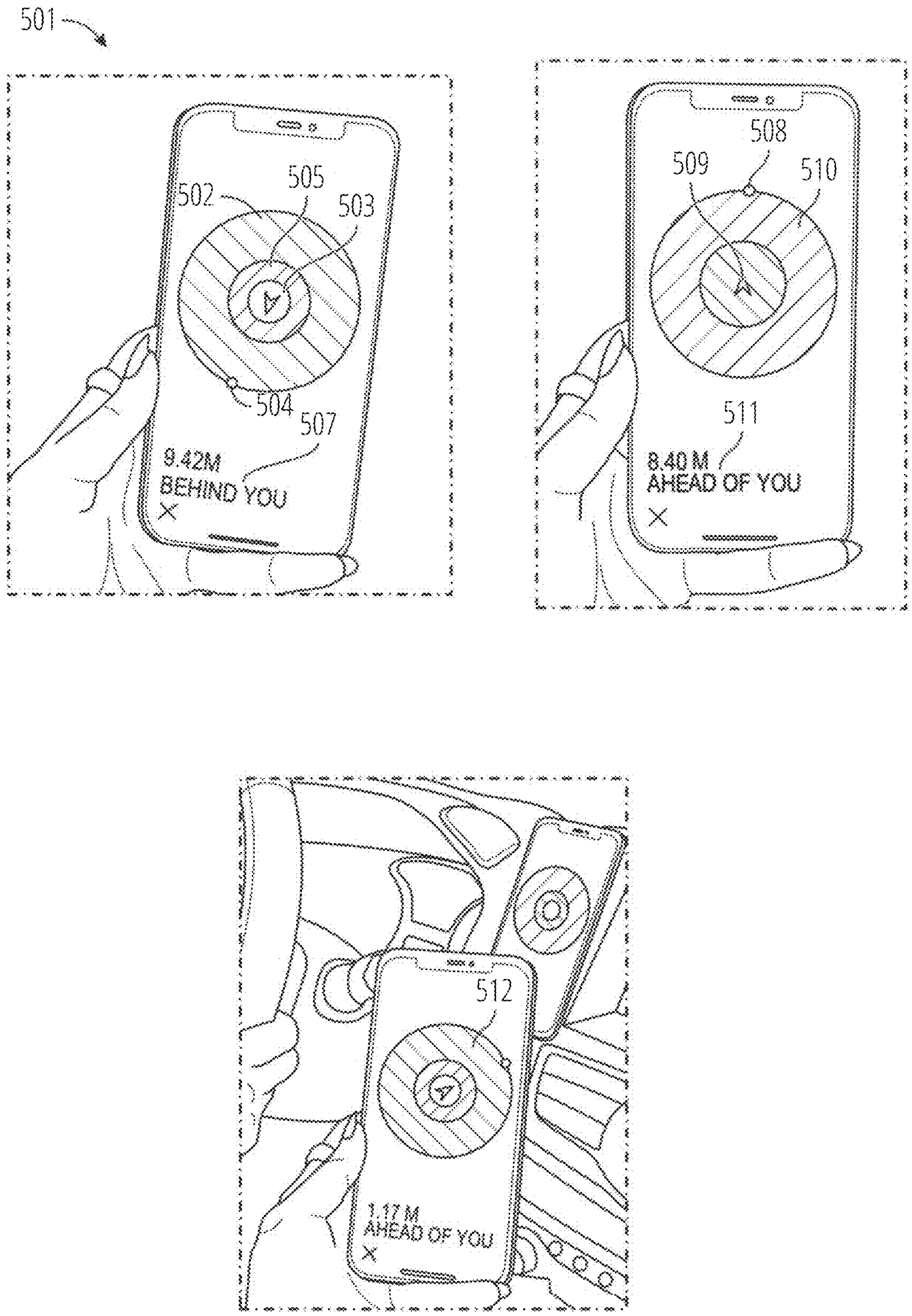
FIG. 5A and FIG. 5B show example inputs/outputs of the network system, according to some examples.
Figure 5B:
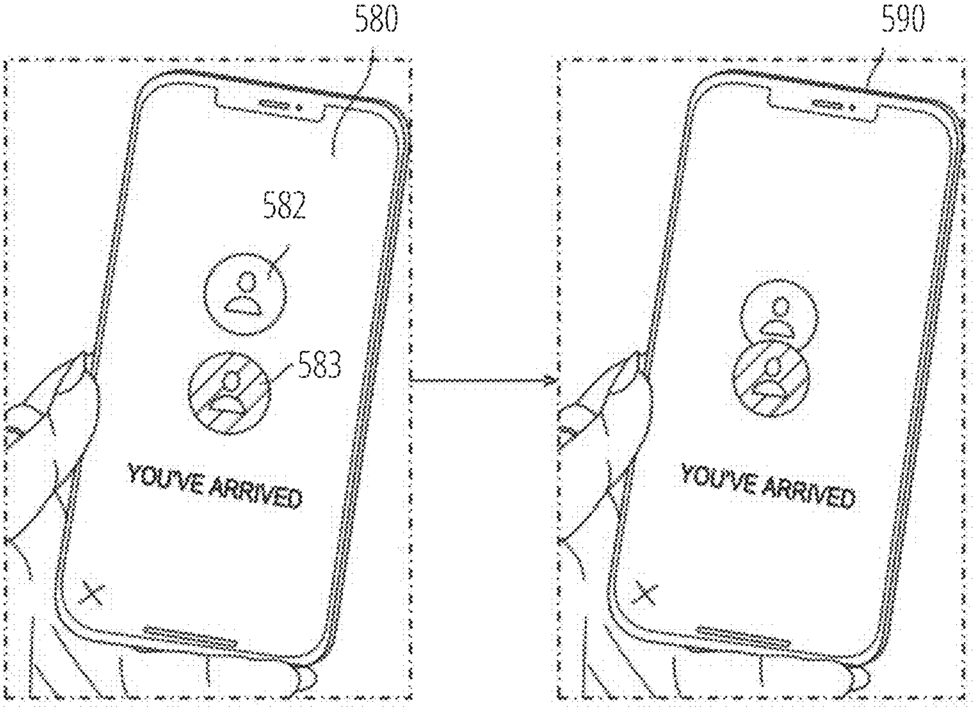

As shown in FIG. 5A, the visual feedback can include a circle 502 (or any other suitable geometric shape). The circle 502 can be presented with a certain visual attribute 505 (e.g., filled with a certain color) and the certain visual attribute 505 can change in real time as the distance and direction between the first and second devices change. For example, the certain visual attribute 505 can be a first color to indicate that the heading (direction of movement) of the first device corresponds to a direction of the second device. The certain visual attribute 505 can be a second color to indicate that the heading (direction of movement) of the first device fails to correspond to the direction of the second device.

The visual feedback can include a visual compass in which a first icon 503 is statically presented in the center of the circle 502. The first icon 503 represents a current position of the first device. The visual compass can include a second icon 504 at an outer edge of the circle 502. The second icon 504 represents a position of the second device relative to a current position of the first device. The first icon 503 can include an arrow that points towards the second icon 504. The visual feedback can also include a message 507 that textually informs the user about how far the second device is from the first device and the direction of the second device (e.g., whether the second device is in front of the first device, to the left of the first device, to the right of the first device, or behind the first device). The first icon 503 can include an avatar (e.g., image, video, and/or animation) representing the user of the first device and the second icon 504 can include an avatar representing the driver or user of the second device.

The network environment 100 rotates the second icon 504 about the visual compass (e.g., the circle 502) as the heading (direction of movement) of the first device changes in real time. For example, the second icon 504 can be presented at a first position on the outer edge of the circle 502 at a first point in time. As the heading of the first device changes (e.g., when the first device changes from moving along one direction to moving along a second direction), the second icon 504 is animated as rotating around the first icon 503 and to reach a second position 508 on the circle 502. The first icon 503 also rotates about its own axis so that the arrow represented by the first icon 503 changes from pointing in one direction of the circle 502 to pointing in another direction 509 on the circle 502. The arrow represented by the first icon 503 always points towards the direction of the second icon 504 along the circle 502 to visually inform the user about which direction the first device needs to head to reach the second device.

The circle 502 changes from being presented with the certain visual attribute 505 (e.g., the first color) to being presented with a second visual attribute 510. This can be performed in response to determining that the first device is moving towards the direction of the second device. Namely, in response to determining that the heading of the first device corresponds to the direction of the second device, the certain visual attribute 505 transitions to the second visual attribute 510. In addition, the message 507 is updated to present the message 511 indicating textually the direction of the second device to the user of the first device.

In some cases, the color or visual attribute of the circle 502 is selected to represent the correct direction of the second device. For example, the circle 502 can be presented in a first color to indicate that the second device is behind the first device. The circle 502 can be presented in a second color to indicate that the second device is in front of the first device. The circle 502 can be presented in a third color to indicate that the second device is to the left of the first device. The circle 502 can be presented in a fourth color to indicate that the second device is to the right of the first device. In some examples, a first portion of the circle 502 can be filled with one color and a second portion of the circle 502 can be filled with a different color to indicate visually the direction of the second device. For example, a left half of the circle 502 can be filled with a fifth color to indicate that a heading towards the left fails to correspond to the direction of the second device and a right half of the circle 502 can be filled with a sixth color to indicate that a heading towards the right corresponds to the direction of the second device. If the heading is determined to correctly align with the direction of the second device, the entire circle 502 is filled with a single color or visual attribute. It should be understood that rather than using different colors, any other visual indicator can be similarly used, such as different hashmarks. The colors can change within a 120 degree arc of movement.

In some examples, the network environment 100 determines that a distance between the first device and the second device is less than a threshold (e.g., the likelihood of co-presence between the first and second devices corresponds to "near"). In response, the network environment 100 presents the circle 502 with an individual visual attribute 512 (e.g., a specific color) indicating that the first and second devices are near each other. The individual visual attribute 512 can differ from the certain visual attribute 505 used to indicate that the first device is heading in the direction that corresponds to the direction of the second device.

In some examples, the network environment 100 can determine that the distance between the first device and the second device is less than the threshold. In such cases, the network environment 100 transitions from presenting the circle 502 to presenting the UIs, shown in FIG. 5B. For example, the network environment 100 can present an animation 580 in which a first avatar 582 (representing the user of the first device) appears to approach a second avatar 583 (representing a user of the second device). Namely, at a first point in time of the animation 580, the first avatar 582 and the second avatar 583 are presented at a first distance from each other. Then, at a second point in time, as shown in the UI 590, the first avatar 582 and the second avatar 583 are presented at a second distance from each other that is smaller than the first distance. Also a message or prompt is presented on the first device indicating to the first user that the first device has arrived at a location of the second device.

In some examples, concurrently with presenting the UIs 501, the network environment 100 can provide audible and/or haptic feedback representing the distance and/or direction between the first and second devices. Specifically, an intensity of the haptic feedback generated by the first device (e.g., a vibration pattern) increases as a particular distance between the first device and the second device becomes smaller. A frequency of the haptic feedback (e.g., the vibration pattern) generated by the first device increases as the particular distance between the first device and the second device becomes smaller. In some cases, an intensity of the haptic feedback decreases as a particular distance between the first device and the second device becomes smaller. A frequency of the haptic feedback decreases as the particular distance between the first device and the second device becomes smaller.

In some examples, an intensity (e.g., volume) of the audible feedback generated by the first device (e.g., a type of sound) increases as a particular distance between the first device and the second device becomes smaller. A frequency (e.g., pitch) of the audible feedback (e.g., the sound) generated by the first device increases as the particular distance between the first device and the second device becomes smaller. In some cases, an intensity of the audible feedback decreases as a particular distance between the first device and the second device becomes smaller. A frequency (e.g., pitch) of the audible feedback decreases as the particular distance between the first device and the second device becomes smaller. In some cases, a particular type of haptic feedback and/or audible feedback or alert can be generated in response to determining that the distance between the first device and the second device is less than a threshold.

Figure 6A:
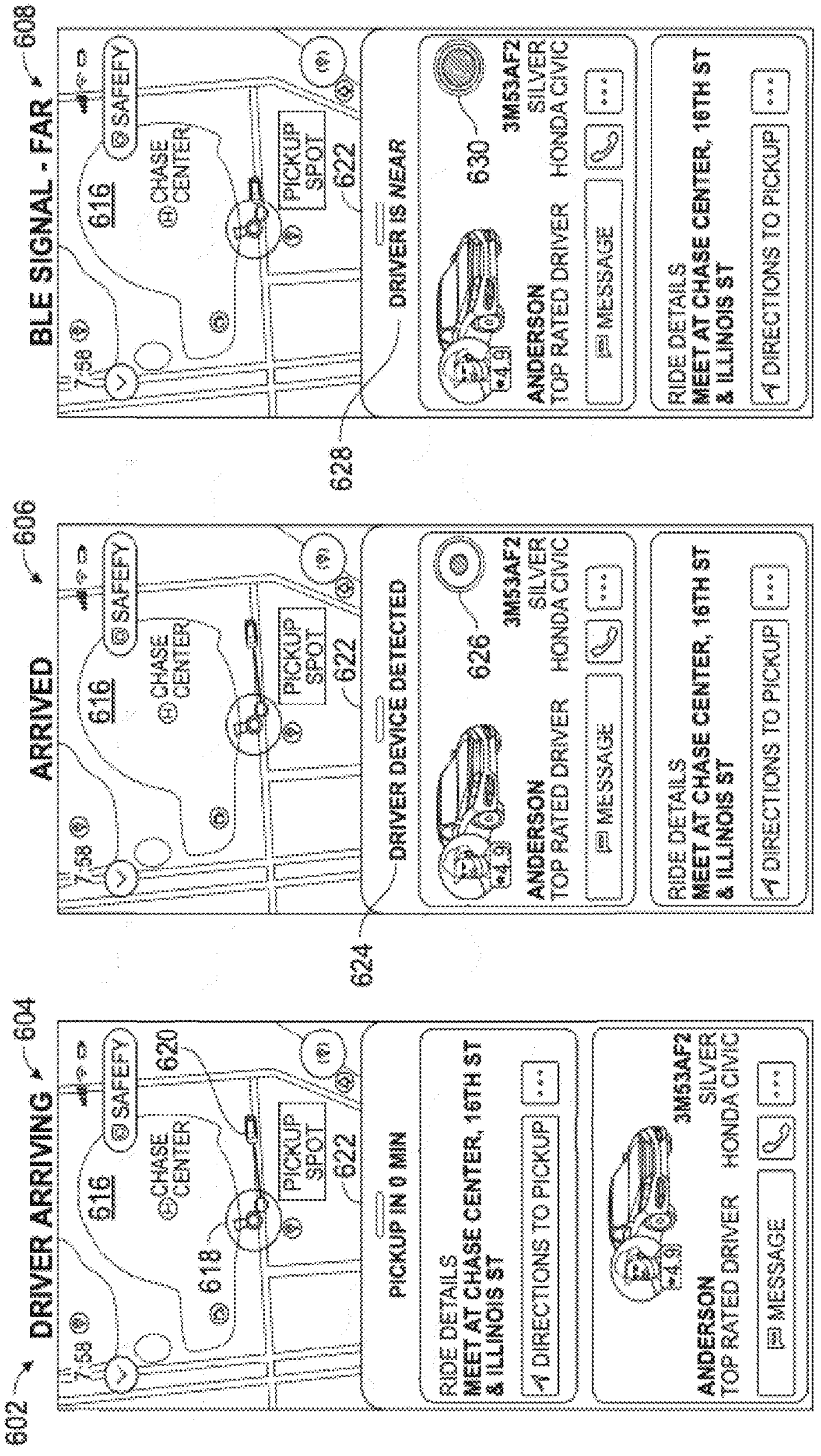
FIG. 6A shows example inputs/outputs of the network system, according to some examples.
Figure 6B:
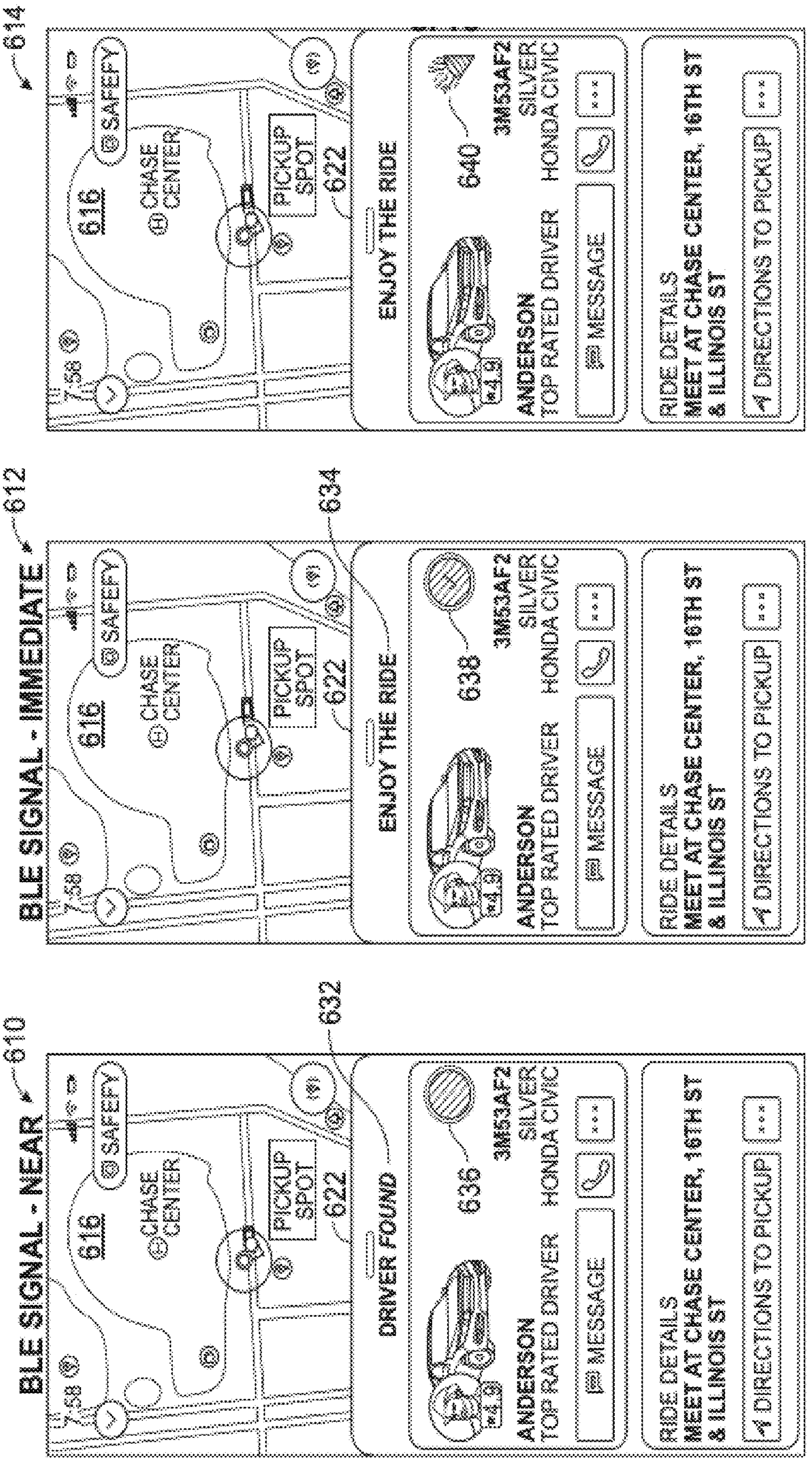
FIG. 6B shows example inputs/outputs of the network system, according to some examples.

FIG. 6A and FIG. 6B are example inputs/outputs of the network environment 100, according to some examples. Specifically, FIG. 6A illustrates a series of user interface diagrams 602 showcasing the evolution of a proximity graphical user interface (GUI) during different stages of a ride-sharing or transportation service interaction. While FIG. 6A is described in the context of a ride-sharing application or transportation service system, similar techniques are applicable to item delivery services. FIG. 6A presents six distinct GUI states that demonstrate the dynamic nature of the co-presence detection system (e.g., network environment 100).

The driver arriving GUI 604 represents the initial stage of the interaction, such as after a user schedules a ride to be picked up by a driver. The driver arriving GUI 604 features a map 616 showing the current location of the second device 620, which is associated with the driver, and the first device 618, which is associated with the rider or user. The proximity information region 622 displays proximity information and an estimated pickup time (e.g., the estimated time of arrival of the second device 620 at the pickup location). Specifically, the driver arriving GUI 604 can be presented when the time of arrival of the second device 620 is within a threshold amount of time of a current time. In such cases, the network system 101 can initiate generating proximity information based on co-presence information. Namely, the network system 101 can use beacon signals transmitted by the second device 620 to compute a likelihood of co-presence (e.g., whether the devices are at a far proximity, near proximity, or immediate proximity). Using this information, the network system 101 can dynamically change the type of information that is presented in the diagrams 602 and/or the way the information is arranged.

In some examples, the proximity information region 622 is presented concurrently with the map 616. The proximity information region 622 can include various information, such as information that identifies the driver associated with the second device 620, an address of the pickup location, and an estimated time of arrival of the driver at the pickup location. The proximity information region 622 can include various options, such as an option that can be selected to receive navigation directions to reach the pickup location from the current location of the first device 618. The proximity information region 622 can include options to contact the driver, such as by sending a text message, voice message, or placing a phone call. In some cases, the driver information in the proximity information region 622 can be placed at a first portion of the proximity information region 622 and the address of the pickup location can be placed at a second portion of the proximity information region 622. For example, the driver information (including the options to contact the driver) can be placed below the address for the pickup location and the options for obtaining navigation directions to the pickup location. The driver arriving GUI 604 can be presented when no beacon signal is detected by the first device 618. Namely, the first device 618 can search for the beacon signal transmitted by the second device 620. While the first device 618 fails to detect the beacon signal, the first device 618 presents the driver arriving GUI 604.

In some examples, as the driver gets closer (e.g., in response to determining that the second device 620 is within a first threshold distance of the first device 618), the driver arriving GUI 604 transitions to the driver arrived GUI 606. For example, once the first device 618 first detects the existence of the beacon signal transmitted by the second device 620, the first device 618 presents the driver arrived GUI 606. The driver arrived GUI 606 presents the map 616 that zooms in to show a more detailed view of the pickup area. In some cases, the driver arrived GUI 606 swaps information that was previously presented in the driver arriving GUI 604. For example, the driver arrived GUI 606 can present the driver information in the proximity information region 622 at the first portion of the proximity information region 622 and the address of the pickup location at the second portion of the proximity information region 622. For example, the driver information (including the options to contact the driver) can be placed above the address for the pickup location and the options for obtaining navigation directions to the pickup location. The transition and swapping of the information can be animated to draw the user's attention to the transition and swapping of the information sets. The driver arrived GUI 606 switches from presenting the estimated time of arrival of the driver to presenting the first proximity information 624 indicating that the second device 620 has been detected.

The proximity information region 622 in the driver arrived GUI 606 now prominently displays a first indicator 626 that is selected from a plurality of indicators (e.g., graphical indicators) based on the proximity or likelihood of co-presence between the two devices. Specifically, the first device 618 can determine whether the beacon signal indicates co-presence information associated with far, near or immediate proximity. If the first device 618 determines that none of these proximities can be determined with a minimum level of accuracy, the first device 618 selects and presents the first indicator 626 from many different kinds of indicators. The first indicator 626 can be a first animation, such as a circle that glows or periodically cycles between different sizes growing and shrinking. As the second device 620 comes closer to the first device 618, the first device 618 can determine that the proximity or co-presence information associated with far co-presence likelihood is associated with the minimum level of accuracy. In response, the first device 618 transitions the driver arrived GUI 606 to the far proximity GUI 608. In the far proximity GUI 608, the first device 618 selects and presents a second indicator 630 from the plurality of indicators or graphical indicators. The second indicator 630 can have different visual attributes than the first indicator 626 (e.g., can be a different color and/or size). The second indicator 630 can also include an animation that differs from the animation of the first indicator 626. For example, the dynamic growing and shrinking of the icon corresponding to the second indicator 630 can be modified at a faster rate than the growing and shrinking of the icon corresponding to the first indicator 626. Also, the far proximity GUI 608 switches from presenting the first proximity information 624 (indicating that the driver device has been detected) to presenting the second proximity information 628 indicating that the driver is near.

As the second device 620 comes closer to the first device 618, the first device 618 can determine that the proximity or co-presence information associated with near co-presence likelihood is associated with the minimum level of accuracy. In response, the first device 618 transitions the far proximity GUI 608 to the near proximity GUI 610 of FIG. 6B. In the near proximity GUI 610, the first device 618 presents a third indicator 636. The third indicator 636 can have different visual attributes than the second indicator 630 (e.g., can be a different color and/or size). The third indicator 636 can also include an animation that differs from the animation of the second indicator 630. For example, the dynamic growing and shrinking of the icon corresponding to the third indicator 636 can be modified at a faster rate than the growing and shrinking of the icon corresponding to the second indicator 630. Also, the near proximity GUI 610 switches from presenting the second proximity information 628 (indicating that the driver device is near) to presenting the near proximity GUI 610 indicating that the driver is found.

As the second device 620 comes closer to the first device 618, the first device 618 can determine that the proximity or co-presence information associated with immediate co-presence likelihood is associated with the minimum level of accuracy. In response, the first device 618 transitions the near proximity GUI 610 to the immediate proximity GUI 612. In the immediate proximity GUI 612, the first device 618 presents a fourth indicator 638. The fourth indicator 638 can have different visual attributes than the third indicator 636 (e.g., can be a different color and/or size). The fourth indicator 638 can also include an animation that differs from the animation of the third indicator 636. For example, the dynamic growing and shrinking of the icon corresponding to the fourth indicator 638 can be modified at a faster rate than the growing and shrinking of the icon corresponding to the third indicator 636. Alternatively, the third indicator 636 changes from being one geometric shape (e.g., a circle) to a different icon corresponding to the fourth indicator 638 (e.g., a checkmark). Also, the immediate proximity GUI 612 switches from presenting the third proximity information 632 (indicating that the driver device is found) to presenting the fourth proximity information 634 indicating the rider has started the ride. In some cases, a fifth indicator 640 shown in the device found GUI 614 can be presented that includes an animation representing celebration that the ride has started.

The incorporation of a map portion alongside the proximity information directly implements the GUI structure outlined in the method, while the use of proximity detection aligns with the beacon signal types mentioned. The overall design and functionality of the GUI as depicted in FIG. 6A demonstrate how the system efficiently guides users through the pickup process, reducing confusion and minimizing wasted time and resources in transportation services.

Figure 7:
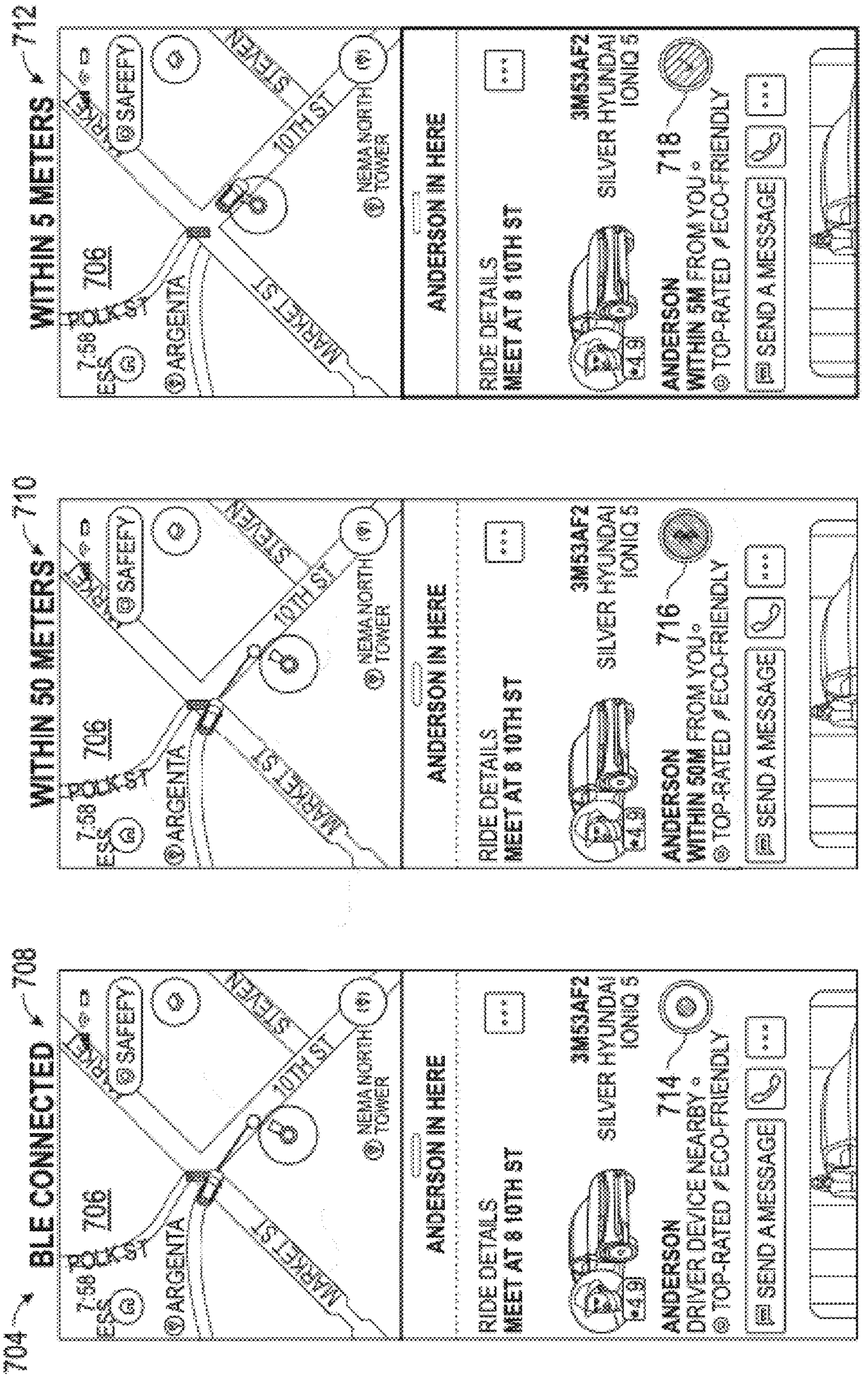
FIG. 7 shows example inputs/outputs of the network system, according to some examples.

FIG. 7 is an example of inputs/outputs of the network environment 100, according to some examples. Specifically, FIG. 7 illustrates a series of user interface diagrams 704 showcasing the evolution of a proximity GUI during different stages of a ride-sharing or transportation service interaction. While this figure is described in the context of a ride-sharing application, similar techniques could be applied to item delivery services. FIG. 7 presents three distinct GUI states that demonstrate the dynamic nature of the co-presence detection system.

The first GUI 708 represents the initial stage of the interaction, such as after a user schedules a ride to be picked up by a driver. It features a map 706 showing the current location of the first device, which is associated with the rider or user, and the second device, which is associated with the driver. The proximity information region displays proximity information and an estimated pickup time. This GUI can be presented when the time of arrival of the second device is within a threshold amount of time of the current time. The first GUI 708 can be presented in response to the first device detecting a beacon signal that is transmitted by the second device. Namely, the first GUI 708 can be presented when a BLE connection is established between the first and second devices. The first GUI 708 presents a first indicator 714. The first indicator 714 can be similar to the first indicator 626 discussed above.

As the driver gets closer, the first GUI 708 transitions to the second GUI 710. This transition occurs when the first device detects that the second device is within 50 meters (but more than 5 meters) from the first device (or between 0.5 meters and 5 meters). This can be performed by measuring the RSSI of the beacon signal or using any other disclosed technique for measuring distance between devices. The second GUI 710 switches the first indicator 714 to presenting the second indicator 716. The second indicator 716 can be similar to the second indicator 630, discussed above. The final third GUI 712 shows the stage when the driver and rider are in very close proximity (e.g., within 0.5 meters of each other). The map 706 can be replaced with a prominent message confirming that the driver's device has been found or that the driver is here. The proximity information region now displays a third indicator 718 (e.g., a checkmark) similar to the fifth indicator 640, discussed above. These indicators can have different visual attributes (e.g., color, size, animation) than the previous indicator to signify the change in proximity.

Throughout these GUI states, the application consistently displays safety information and navigation options. The user interface dynamically adjusts the prominence and positioning of information based on the current stage of the ride and the proximity between the first device and second device.

This adaptive GUI design, as illustrated in FIG. 7, supports the method of providing clear, real-time visual feedback to users based on the co-presence information generated from beacon signal detection. The use of different indicators for various proximity levels (far, near, immediate) aligns with the concept of selecting specific graphical indicators based on the determined proximity between devices. The dynamic rearrangement of information in the proximity information region, as seen in the transitions between GUI states, corresponds to the functionality of swapping information display locations based on changing proximity levels.

The incorporation of a map 706 alongside the proximity information directly implements the GUI structure outlined in the method, while the use of proximity detection aligns with the beacon signal types mentioned. The overall design and functionality of the GUI as depicted in FIG. 7 demonstrate how the system efficiently guides users through the pickup process, reducing confusion and minimizing wasted time and resources in transportation services.

Figure 8:
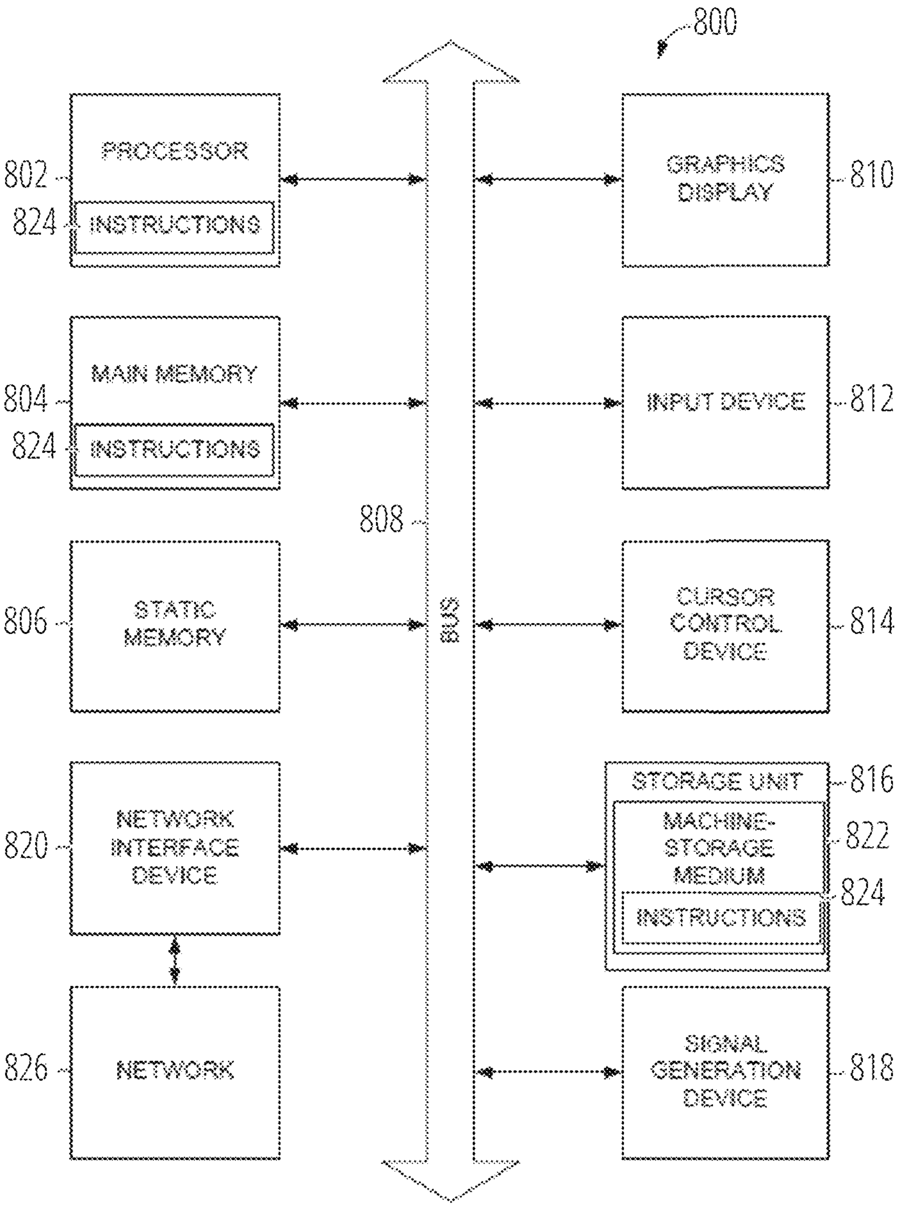
FIG. 8 is a block diagram illustrating components of a machine, according to some examples, able to read instructions from a machine-storage medium and perform any one or more of the methodologies discussed herein.

FIG. 8 illustrates components of a machine 800, according to some examples, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIG. 4. In one example, the instructions 824 can transform the general, non-programmed machine 800 into a particular machine (e.g., specially configured machine) programmed to carry out the described and illustrated functions in the manner described.

In alternative examples, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some examples, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 504, 506, and/or memory of the processor(s) 502) and/or storage unit 816 may store one or more sets of instructions and data structures (e.g., software embodying or utilized by any one or more of the methodologies or functions described herein. These instructions, when executed by processor(s) 502 cause various operations to implement the disclosed examples.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or machine-storage medium 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and machine-storage medium 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a LAN, a WAN, the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain examples are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some examples, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In examples in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some examples, the one or more processors or processor-implemented modules may be located in a single geographic location (e.g., within a home environment, an office environment, or a server farm). In other examples, the one or more processors or processor-implemented modules may be distributed across a number of geographic locations.

EXAMPLES

Example 1. A method comprising: detecting, by a first device associated with a first user, a beacon signal generated by a second device associated with a second user; generating co-presence information representing proximity between the first device and the second device based on detecting the beacon signal; selecting a graphical indicator from a plurality of graphical indicators of co-presence based on the generated co-presence information; and presenting a proximity graphical user interface (GUI) comprising a map portion and a co-presence portion using the selected graphical indicator.

Example 2. The method of Example 1, further comprising: triggering the first device to scan for a signal from the second device.

Example 3. The method of any one of Examples 1-2, wherein the beacon signal is generated by a transmission device that comprises at least one of a Wi-Fi base station, a Bluetooth device, or an ultra-wide band emitting device.

Example 4. The method of any one of Examples 1-3, wherein the first user is a rider of a trip, wherein the second user is a driver.

Example 5. The method of any one of Examples 1-4, further comprising: prior to detecting the beacon signal, determining that the beacon signal is beyond a detection range of the first device; and in response to determining that the beacon signal is beyond the detection range of the first device, preventing display of the graphical indicator in the proximity GUI.

Example 6. The method of Example 5, wherein the co-presence portion comprises a first set of information identifying a pickup location for the first and second users and a second set of information identifying the second user, the first set of information being presented in a first portion of the co-presence portion and the second set of information being presented in a second portion of the co-presence portion.

Example 7. The method of Example 6, wherein the co-presence portion comprises an amount of time remaining before the second device arrives at the pickup location.

Example 8. The method of any one of Examples 6-7, further comprising: in response to detecting the beacon signal, swapping locations in which the first and second sets of information are presented, such that the second set of information is presented in the first portion of the co-presence portion and the first set of information is presented in the second portion of the co-presence portion; and adding the selected graphical indicator to the second set of information.

Example 9. The method of Example 8, further comprising: determining that the co-presence information represents a first proximity between the first device and the second device; and selecting a first graphical indicator as the selected graphical indicator in response to determining that the co-presence information represents the first proximity between the first device and the second device.

Example 10. The method of Example 9, wherein the first graphical indicator comprises a first animation, the first proximity comprising far proximity.

Example 11. The method of any one of Examples 9-10, wherein the first proximity is determined in response to establishing a BLE connection between the first and second devices.

Example 12. The method of any one of Examples 9-11, further comprising: determining that the co-presence information represents a second proximity between the first device and the second device; and selecting a second graphical indicator as the selected graphical indicator in response to determining that the co-presence information represents the second proximity between the first device and the second device.

Example 13. The method of Example 12, wherein the second proximity comprises near proximity.

Example 14. The method of any one of Examples 12-13, wherein the second proximity corresponds to a first distance between the first and second devices that is less than 50 meters.

Example 15. The method of any one of Examples 12-14, further comprising: determining that the co-presence information represents a third proximity between the first device and the second device; and selecting a third graphical indicator as the selected graphical indicator in response to determining that the co-presence information represents the third proximity between the first device and the second device.

Example 16. The method of Example 15, wherein the third proximity comprises immediate proximity.

Example 17. The method of any one of Examples 15-16, wherein the second proximity corresponds to a second distance between the first and second devices that is less than 0.5 meters.

Example 18. The method of any one of Examples 1-17, further comprising: determining, by the first device based on a UWB link comprising the beacon signal, a direction to the second device and a first distance between the first device and the second device; and presenting, by the first device, real-time feedback representing the direction to the second device and the first distance between the first device and the second device.

Example 19. A system comprising: one or more hardware processors; and a storage medium storing instructions that, when executed by the one or more hardware processors, cause the one or more hardware processors to perform operations comprising: detecting, by a first device associated with a first user, a beacon signal generated by a second device associated with a second user; generating co-presence information representing proximity between the first device and the second device based on detecting the beacon signal; selecting a graphical indicator from a plurality of graphical indicators of co-presence based on the generated co-presence information; and presenting a proximity graphical user interface (GUI) comprising a map portion and a co-presence portion using the selected graphical indicator.

Example 20. A machine-storage medium storing instructions that, when executed by one or more processors of a machine, cause the machine to perform operations comprising: detecting, by a first device associated with a first user, a beacon signal generated by a second device associated with a second user; generating co-presence information representing proximity between the first device and the second device based on detecting the beacon signal; selecting a graphical indicator from a plurality of graphical indicators of co-presence based on the generated co-presence information; and presenting a proximity graphical user interface (GUI) comprising a map portion and a co-presence portion using the selected graphical indicator.

Example 21: A method comprising: detecting, by a first device associated with a first user, a beacon signal generated by a second device associated with a second user; determining that the first device and the second device are co-present based on detecting the beacon signal; based on determining that the first device and the second device are co-present, computing a duration representing how long the first device and the second device remained co-present; and performing one or more operations based on the duration representing how long the first device and the second device remained co-present.

Example 22. The method of Example 21, further comprising: triggering the first device to scan for the signals from the second device.

Example 23. The method of any one of Examples 1-22, wherein the beacon signal is generated by a transmission device that comprises at least one of a Wi-Fi base station, a Bluetooth device, or an ultra-wide band emitting device.

Example 24. The method of any one of Examples 1-23, wherein the first user is a rider of a trip, wherein the second user is a driver, further comprising: determining a trip duration based on the duration representing how long the first device and the second device remained co-present, the trip duration comprising a trip start time and a trip end time.

Example 25. The method of Example 24, further comprising: determining the trip start time in response to determining that a signal strength of the beacon signal received by the first device transgresses a threshold value; and determining the trip end time in response to determining that the signal strength of the beacon signal received by the first device fails to transgress the threshold value after determining the trip start time.

Example 26. The method of any one of Examples 1-25, further comprising: accessing trip information generated based on input received by the second device from the second user, the input designating a particular trip duration; and comparing the particular trip duration to the determined trip duration.

Example 27. The method of Example 26, further comprising: flagging the second device for review in response to determining that a difference between the particular trip duration and the determined trip duration transgresses a threshold.

Example 28. The method of any one of Examples 1-27, further comprising: adjusting a trip fare in response to determining that a difference between the particular trip duration and the determined trip duration transgresses a threshold.

Example 29. The method of any one of Examples 1-28, further comprising: receiving an indication from the second device that the trip has ended; continuing to detect at the first device the beacon signal that is generated by the second device after receiving the indication from the second device that the trip has ended; determining that the beacon signal continues to be detected by the first device for a threshold period of time after receiving the indication from the second device that the trip has ended; and triggering an alert in response to determining that the beacon signal continues to be detected by the first device for the threshold period of time after receiving the indication from the second device that the trip has ended.

Example 30. The method of Example 29, wherein the alert is triggered on the first device or on a transportation service manager device associated with the second device.

Example 31. The method of any one of Examples 1-30, further comprising: detecting, by the first device, a plurality of beacon signals generated by a plurality of devices including the beacon signal generated by the second device; and computing a likelihood representing co-presence between the first device and the second device based on comparing signal strengths of the plurality of beacon signals that are detected, the computed likelihood indicating that the first device and the second device are more likely to be co-present than the first device and a third device of the plurality of devices.

Example 32. The method of Example 31, wherein the beacon signal generated by the second device and detected by the first device is associated with a first signal strength, further comprising: after a threshold period of time elapses since the plurality of beacon signals are detected by the first device, computing a second signal strength for the beacon signal generated by the second device and detected by the first device; determining that the second signal strength remains within a threshold difference from the first signal strength; and in response to determining that the second signal strength remains within the threshold difference from the first signal strength, determining that co-presence between the first device and second device is correct.

Example 33. The method of any one of Examples 1-32, wherein the beacon signal generated by the second device and detected by the first device is associated with a first signal strength, further comprising: after a threshold period of time elapses since the plurality of beacon signals are detected by the first device, computing a second signal strength for the beacon signal generated by the second device and detected by the first device; determining that the second signal strength fails to remain within a threshold difference from the first signal strength; and in response to determining that the second signal strength fails to remain within the threshold difference from the first signal strength, determining that co-presence between the first device and second device is incorrect.

Example 34. The method of Example 33, further comprising: determining that the second device is associated with a trip for a different user than the first user in response to determining that the co-presence between the first device and second device is incorrect; retrieving a correct trip associated with the first user from a server; and replacing the trip currently associated with the second device with the retrieved correct trip associated with the first user in response to determining that the co-presence between the first device and second device was incorrect.

Example 35. The method of any one of Examples 1-34, further comprising: determining item preparation time associated with a facility corresponding to the second device based on the computed duration.

Example 36. The method of Example 35, further comprising: aggregating a plurality of item preparation time durations based on a plurality of durations computed based on detection of the beacon signal, generated by the second device, by a plurality of devices, each of the plurality of item preparation time durations being computed based on a difference between when a signal strength associated with the beacon signal transgresses a threshold indicating arrival of a respective device at the facility and when the signal strength associated with the beacon signal fails to transgress the threshold indicating departure of the respective device from the facility after having arrived at the facility.

Example 37. The method of Example 36, further comprising: training an item preparation time model to predict an item preparation time for the facility based on training data comprising the plurality of item preparation time durations, the item preparation model being trained by performing training operations comprising: predicting, by the item preparation model, an estimated item preparation time for the facility; retrieving a first item preparation time duration from the plurality of item preparation time durations of the training data; computing a deviation between the first item preparation time duration and the estimated item preparation time for the facility; and updating one or more parameters of the item preparation time model based on the computed deviation.

Example 38. The method of any one of Examples 1-37, further comprising: obtaining a beacon identifier associated with the facility by the first device; detecting a plurality of beacon signals in an environment comprising the facility; and determining that the first device and the second device are co-present based on one of the beacon signals associated with the obtained beacon identifier.

Example 39. A system comprising: one or more hardware processors; and a storage medium storing instructions that, when executed by the one or more hardware processors, cause the one or more hardware processors to perform operations comprising: detecting, by a first device associated with a first user, a beacon signal generated by a second device associated with a second user; determining that the first device and the second device are co-present based on detecting the beacon signal; based on determining that the first device and the second device are co-present, computing a duration representing how long the first device and the second device remained co-present; and performing one or more operations based on the duration representing how long the first device and the second device remained co-present.

Example 40. A machine-storage medium storing instructions that, when executed by one or more processors of a machine, cause the machine to perform operations comprising: detecting, by a first device associated with a first user, a beacon signal generated by a second device associated with a second user; determining that the first device and the second device are co-present based on detecting the beacon signal; based on determining that the first device and the second device are co-present, computing a duration representing how long the first device and the second device remained co-present; and performing one or more operations based on the duration representing how long the first device and the second device remained co-present.

Example 41. A method comprising: establishing a bidirectional ultra-wideband (UWB) link between a first device and a second device, the first device being associated with a user, the second device being associated with a target; determining, by the first device based on the UWB link, a direction to the second device and a first distance between the first device and the second device; presenting, by the first device, real-time feedback representing the direction to the second device and the distance between the first device and the second device; and in response to determining that a second distance between the first device and the second device is less than a threshold, presenting a confirmation message indicating that the first device has arrived at a location of the second device.

Example 42. The method of Example 41, wherein the real-time feedback comprises at least one of visual feedback, haptic feedback, or audible feedback.

Example 43. The method of Example 42, wherein the visual feedback comprises visual compass, wherein a first icon corresponding to the user is placed on a first position on the visual compass, and wherein a second icon corresponding to the target is placed on a second position on the visual compass.

Example 44. The method of Example 43, further comprising animating the second icon rotating around the visual compass as a position of the first device changes and based on the direction from the first device to the second device.

Example 45. The method of Example 44, wherein the first icon remains stationary as the second icon is rotating around the visual compass.

Example 46. The method of any one of Examples 1-45, further comprising: at a first point in time, presenting the second icon with a first size in response to determining the first distance between the first device and the second device; and at a second point in time, increasing the first size of the second icon to a second size in response to determining that a third distance between the first device and the second device is smaller than the first distance.

Example 47. The method of any one of Examples 1-46, further comprising: at a first point in time, presenting the second icon with a first size in response to determining the first distance between the first device and the second device; and at a second point in time, decreasing the first size of the second icon to a second size in response to determining that a third distance between the first device and the second device is greater than the first distance.

Example 48. The method of any one of Examples 1-47, wherein the second icon comprises an avatar of the target.

Example 49. The method of any one of Examples 1-48, further comprising: animating the first icon intersecting the second icon in response to determining that the second distance between the first device and the second device is less than the threshold.

Example 50. The method of any one of Examples 1-49, wherein an intensity of the haptic feedback increases as a particular distance between the first device and the second device becomes smaller, and wherein a frequency of the haptic feedback increases as the particular distance between the first device and the second device becomes smaller.

Example 51. The method of any one of Examples 1-50, wherein an intensity of the haptic feedback decreases as a particular distance between the first device and the second device becomes smaller, and wherein a frequency of the haptic feedback decreases as the particular distance between the first device and the second device becomes smaller.

Example 52. The method of any one of Examples 1-51, wherein an intensity of the audible feedback increases as a particular distance between the first device and the second device becomes smaller, and wherein a frequency of the audible feedback increases as the particular distance between the first device and the second device becomes smaller.

Example 53. The method of any one of Examples 1-52, wherein an intensity of the audible feedback decreases as a particular distance between the first device and the second device becomes smaller, and wherein a frequency of the audible feedback decreases as the particular distance between the first device and the second device becomes smaller.

Example 54. The method of any one of Examples 1-53, further comprising: determining that the UWB link has failed to be established; and in response to determining that the UWB link has failed to be established, accessing global positioning signals (GPS) to determine a particular distance between the first device and the second device for presenting the real-time feedback.

Example 55. The method of any one of Examples 1-54, further comprising: presenting a positioning indicator comprising a first visual attribute in response to determining that a heading of the first device corresponds to the direction to the second device; and changing the first visual attribute of the positioning indicator to a second visual attribute in response to determining that the heading of the first device fails to correspond to the direction to the second device.

Example 56. The method of Example 55, wherein the positioning indicator comprises a circle, wherein a first portion of the circle is filled with a first color indicating a correct heading towards the direction of the second device, and wherein a second portion of the circle is filled with a second color indicating an incorrect heading towards the direction of the second device.

Example 57. The method of Example 56, further comprising filling the circle entirely with the first color in response to determining that the heading of the first device corresponds to the direction to the second device, wherein the circle is filled with a third color in response to determining that the second distance between the first device and the second device is less than the threshold.

Example 58. The method of any one of Examples 1-57, wherein the user is a passenger, and wherein the target is a driver of a ridesharing service.

Example 59. A system comprising: one or more hardware processors; and a storage medium storing instructions that, when executed by the one or more hardware processors, cause the one or more hardware processors to perform operations comprising: establishing a bidirectional Ultra-Wideband (UWB) link between a first device and a second device, the first device being associated with a user, the second device being associated with a target; determining, by the first device based on the UWB link, a direction to the second device and a first distance between the first device and the second device; presenting, by the first device, real-time feedback representing the direction to the second device and the distance between the first device and the second device; and in response to determining that a second distance between the first device and the second device is less than a threshold, presenting a confirmation message indicating that the first device has arrived at a location of the second device.

Example 60. A machine-storage medium storing instructions that, when executed by one or more processors of a machine, cause the machine to perform operations comprising: establishing a bidirectional Ultra-Wideband (UWB) link between a first device and a second device, the first device being associated with a user, the second device being associated with a target; determining, by the first device based on the UWB link, a direction to the second device and a first distance between the first device and the second device; presenting, by the first device, real-time feedback representing the direction to the second device and the distance between the first device and the second device; and in response to determining that a second distance between the first device and the second device is less than a threshold, presenting a confirmation message indicating that the first device has arrived at a location of the second device.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present disclosure. For example, various examples or features thereof may be mixed and matched or made optional by a person of ordinary skill in the art.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A method comprising:

detecting, by a first device associated with a first user, a beacon signal generated by a second device associated with a second user;

generating co-presence information representing proximity between the first device and the second device based on detecting the beacon signal;

selecting a first graphical indicator from a plurality of graphical indicators of co-presence based on the generated co-presence information representing a first proximity between the first device and the second device;

presenting a proximity graphical user interface (GUI) comprising a map portion and a co-presence portion presented concurrently with the map portion, the co-presence portion being separate from the map portion and comprising the first graphical indicator;

determining that the co-presence information has changed from representing the first proximity to representing a second proximity between the first device and the second device, the second proximity being different from the first proximity; and in response to determining that the co-presence information has changed to representing the second proximity, replacing the first graphical indicator in the co-presence portion, which is presented concurrently with the map portion, with a second graphical indicator from the plurality of graphical indicators, the second graphical indicator having one or more visual attributes different from the first graphical indicator.

2. The method of claim 1, further comprising:

prior to detecting the beacon signal, triggering the first device to scan for the beacon signal from the second device.

3. The method of claim 1, wherein the beacon signal is generated by a transmission device that comprises at least one of a Wi-Fi base station, a Bluetooth device, or an ultra-wide band emitting device.

4. The method of claim 1, wherein the first user is a rider of a trip, wherein the second user is a driver.

5. The method of claim 1, further comprising:

prior to detecting the beacon signal, searching, by the first device, for the beacon signal transmitted by the second device and failing to detect the beacon signal; and in response to failing to detect the beacon signal, preventing display of the first graphical indicator in the proximity GUI.

6. The method of claim 5, wherein the co-presence portion comprises a first set of information identifying a pickup location for the first and second users and a second set of information identifying the second user, the first set of information being presented in a first portion of the co-presence portion and the second set of information being presented in a second portion of the co-presence portion.

7. The method of claim 6, wherein the co-presence portion comprises an amount of time remaining before the second device arrives at the pickup location.

8. The method of claim 6, further comprising:

presenting the co-presence portion with the first set of information in the first portion and the second set of information in the second portion prior to detecting the beacon signal; and in response to detecting the beacon signal, transitioning the co-presence portion from presenting the first set of information in the first portion and the second set of information in the second portion to presenting the second set of information in the first portion and the first set of information in the second portion, and adding the second graphical indicator to the second set of information.

9. The method of claim 8, further comprising:

determining that the co-presence information represents the first proximity between the first device and the second device; and selecting the first graphical indicator as the selected graphical indicator in response to determining that the co-presence information represents the first proximity between the first device and the second device.

10. The method of claim 9, wherein the first graphical indicator comprises a first animation, the first proximity comprising far proximity.

11. The method of claim 9, wherein the first proximity is determined in response to establishing a BLE connection between the first and second devices.

12. The method of claim 9, further comprising:

determining that the co-presence information represents the second proximity between the first device and the second device; and selecting the second graphical indicator in response to determining that the co-presence information represents the second proximity between the first device and the second device.

13. The method of claim 12, wherein the second proximity comprises near proximity.

14. The method of claim 12, wherein the second proximity corresponds to a first distance between the first and second devices that is less than 50 meters.

15. The method of claim 12, further comprising:

determining that the co-presence information represents a third proximity between the first device and the second device; and selecting a third graphical indicator in response to determining that the co-presence information represents the third proximity between the first device and the second device.

16. The method of claim 15, wherein the third proximity comprises immediate proximity.

17. The method of claim 15, wherein the second proximity corresponds to a second distance between the first and second devices that is less than 0.5 meters.

18. The method of claim 1, further comprising:

determining, by the first device based on a UWB link comprising the beacon signal, a direction to the second device and a first distance between the first device and the second device; and presenting, by the first device, real-time feedback representing the direction to the second device and the first distance between the first device and the second device.

19. A system comprising:

one or more hardware processors; and a storage medium storing instructions that, when executed by the one or more hardware processors, cause the one or more hardware processors to perform operations comprising:

detecting, by a first device associated with a first user, a beacon signal generated by a second device associated with a second user;

generating co-presence information representing proximity between the first device and the second device based on detecting the beacon signal;

selecting a first graphical indicator from a plurality of graphical indicators of co-presence based on the generated co-presence information representing a first proximity between the first device and the second device;

presenting a proximity graphical user interface (GUI) comprising a map portion and a co-presence portion presented concurrently with the map portion, the co-presence portion being separate from the map portion and comprising the first graphical indicator;

determining that the co-presence information has changed from representing the first proximity to representing a second proximity between the first device and the second device, the second proximity being different from the first proximity; and in response to determining that the co-presence information has changed to representing the second proximity, replacing the first graphical indicator in the co-presence portion, which is presented concurrently with the map portion, with a second graphical indicator from the plurality of graphical indicators, the second graphical indicator having one or more visual attributes different from the first graphical indicator.

20. A non-transitory machine-storage medium storing instructions that, when executed by one or more processors of a machine, cause the machine to perform operations comprising:

detecting, by a first device associated with a first user, a beacon signal generated by a second device associated with a second user;

generating co-presence information representing proximity between the first device and the second device based on detecting the beacon signal;

selecting a first graphical indicator from a plurality of graphical indicators of co-presence based on the generated co-presence information representing a first proximity between the first device and the second device;

presenting a proximity graphical user interface (GUI) comprising a map portion and a co-presence portion presented concurrently with the map portion, the co-presence portion being separate from the map portion and comprising the first graphical indicator;

determining that the co-presence information has changed from representing the first proximity to representing a second proximity between the first device and the second device, the second proximity being different from the first proximity; and in response to determining that the co-presence information has changed to representing the second proximity, replacing the first graphical indicator in the co-presence portion, which is presented concurrently with the map portion, with a second graphical indicator from the plurality of graphical indicators, the second graphical indicator having one or more visual attributes different from the first graphical indicator.

* * * * *